May 31, 1960 H. S. BEATTIE ET AL 2,939,110

COMPARING DEVICE FOR EMPLOYMENT IN A RECORD CARD COLLATOR OR LIKE MACHINE

Filed Feb. 4, 1954 15 Sheets-Sheet 1

INVENTORS
HORACE S. BEATTIE
RALPH E. PAGE
RALPH L. PALMER

BY Wesley De Bruin

ATTORNEY

*INVENTORS*
HORACE S. BEATTIE
RALPH E. PAGE
RALPH L. PALMER

*BY* Wesley De Bruin
ATTORNEY

INVENTORS
HORACE S. BEATTIE
RALPH E. PAGE
BY RALPH L. PALMER
Wesley DeBruin
ATTORNEY May 31, 1960 H. S. BEATTIE ET AL 2,939,110

COMPARING DEVICE FOR EMPLOYMENT IN A RECORD CARD COLLATOR OR LIKE MACHINE

Filed Feb. 4, 1954 15 Sheets-Sheet 4

INVENTORS
HORACE S. BEATTIE
RALPH E. PAGE
RALPH L. PALMER

BY Wesley De Bruin
ATTORNEY

May 31, 1960 H. S. BEATTIE ET AL 2,939,110

COMPARING DEVICE FOR EMPLOYMENT IN A RECORD CARD COLLATOR OR LIKE MACHINE

Filed Feb. 4, 1954 15 Sheets-Sheet 5

INVENTORS
HORACE S. BEATTIE
RALPH E. PAGE
RALPH L. PALMER

BY Wesley De Bruin
ATTORNEY

INVENTORS
HORACE S. BEATTIE
RALPH E. PAGE
BY RALPH L. PALMER
Wesley De Bruin
ATTORNEY INVENTORS
HORACE S. BEATTIE
RALPH E. PAGE
RALPH L. PALMER
BY Wesley De Bruin
ATTORNEY

EXAMPLE NO. 1
READ-IN TIME
"5"

EXAMPLE NO. 1
READ-IN TIME
"3"

INVENTORS
HORACE S. BEATTIE
RALPH E. PAGE
BY RALPH L. PALMER
Wesley DeBruin
ATTORNEY

*INVENTORS*
HORACE S. BEATTIE
RALPH E. PAGE
*BY* RALPH L. PALMER
Wesley DeBruin
ATTORNEY May 31, 1960 H. S. BEATTIE ET AL 2,939,110

COMPARING DEVICE FOR EMPLOYMENT IN A RECORD CARD COLLATOR OR LIKE MACHINE

Filed Feb. 4, 1954 15 Sheets-Sheet 10

*INVENTORS*
HORACE S. BEATTIE
RALPH E. PAGE
RALPH L. PALMER

*BY* Wesley DeBruin
ATTORNEY

*INVENTORS*
HORACE S. BEATTIE
RALPH E. PAGE
*BY* RALPH L. PALMER
Wesley De Bruin
ATTORNEY INVENTORS
HORACE S. BEATTIE
RALPH E. PAGE
RALPH L. PALMER
BY Wesley De Bruin
ATTORNEY INVENTORS
HORACE S. BEATTIE
RALPH E. PAGE
RALPH L. PALMER
BY Wesley De Bruin
ATTORNEY

COMPARING DEVICE FOR EMPLOYMENT IN A RECORD CARD COLLATOR OR LIKE MACHINE

Filed Feb. 4, 1954

EXAMPLE NO. 5
120° MACHINE TIME

EXAMPLE NO. 6
120° MACHINE TIME

*INVENTORS*
HORACE S. BEATTIE
RALPH E. PAGE
RALPH L. PALMER
*BY* Wesley DeBruin
ATTORNEY INVENTORS
HORACE S. BEATTIE
RALPH E. PAGE
RALPH L. PALMER
BY Wesley DeBruin
ATTORNEY

United States Patent Office 2,939,110

Patented May 31, 1960

2,939,110

COMPARING DEVICE FOR EMPLOYMENT IN A RECORD CARD COLLATOR OR LIKE MACHINE

Horace S. Beattie, Poughkeepsie, Ralph E. Page, Lagrangeville, and Ralph L. Palmer, Poughkeepsie, N.Y., assignors to International Business Machines Corporation, New York, N.Y., a corporation of New York Filed Feb. 4, 1954, Ser. No. 408,132

1 Claim. (Cl. 340—149)

This invention relates to a comparing device and more particularly to a comparing device which may be used in a record card controlled machine. The record card controlled machine may be of the type generally known in the art as a record card collator.

The following United States patents each disclose a record controlled machine generally of the collator type: No. 2,359,670, granted to R. E. Page on October 3, 1944; No. 2,379,828, granted to D. W. Rubidge et al. on July 3, 1945; No. 2,602,544, granted to B. E. Phelps et al. on July 8, 1952; and No. 2,602,545, granted to H. P. Luhn et al. on July 8, 1952.

The comparing device disclosed hereinafter will indicate the relative order as between a first series of pulse groups and a synchronized second series of pulse groups. The first series of pulse groups may be formed by simultaneously reading a plurality of columns of a first or primary record card and storing this information serially by column on a first magnetic track and then reading the information from said first magnetic track in serial by column order. The second series of pulse groups may be formed by simultaneously reading a plurality of columns of a second or secondary record card and storing this information serially by column on a second magnetic track and then reading the information from said second magnetic track in serial by column order. The readings from said first and second magnetic tracks are synchronized.

The pulse groups to be compared may be read respectively from magnetic drum storage units, a first or primary drum serving as a first source of pulse groups and a second or secondary drum, synchronized with respect to said first drum, serving as a second source of pulse groups.

The primary object of the invention is to provide a simple comparing device capable of fast accurate operation.

A second object of the invention is to provide a comparing circuit which has a small number of components and is easy and economical to produce.

A further object of the invention is a comparing device which is readily adaptable for use with multiple deck record cards generally of the type disclosed in United States Patent No. 2,602,545, issued to H. U. Luhn et al. on July 8, 1952, and in United States patent application No. 346,976 of John F. Coleman, filed on April 6, 1953, now Patent No. 2,750,113.

Yet another object of the present invention is to provide a compact comparing device which has a wide degree of utility.

A still further object of the invention is a comparing device having increased capacity.

An additional object of the invention is an electronic comparing circuit which consists of a minimum number of components and is fast and accurate in operation.

An additional object of the invention is a novel method for serially storing the information obtained from a record card, and subsequently serially reading said information.

Other objects of the invention will be pointed out in the following description and claim and illustrated in the accompanying drawings, which disclose, by way of examples, the principle of the invention and the best mode, which has been contemplated, of applying that principle.

In the drawings:

Fig. 1 is a schematic diagram disclosing a first source of pulse groups and a second source of pulse groups connected to a comparer circuit of the type disclosed in detail in Fig. 3.

Fig. 2 schematically discloses means for reading information from a primary record card and magnetic means for serially storing and subsequently serially reproducing the information read from said primary record card. Fig. 2 also discloses means for reading information from a secondary record card and for serially storing and subsequently serially reproducing the information read from said secondary record card.

Fig. 2A is a timing chart of the complete machine, i.e., including the read-in time, read-out time, reset time, and erase time, as labelled in Fig. 2A.

Fig. 3 is a detailed circuit diagram of the comparer circuit shown in block form in Fig. 1. The comparer circuit of Fig. 3 is also used in combination with the apparatus shown in Fig. 2. The detailed circuits of the blocks shown in Fig. 3 are set forth in the figures enumerated hereinafter.

Fig. 3B is to be read in conjunction with the read-out timing chart of Fig. 3A.

Figure 1:
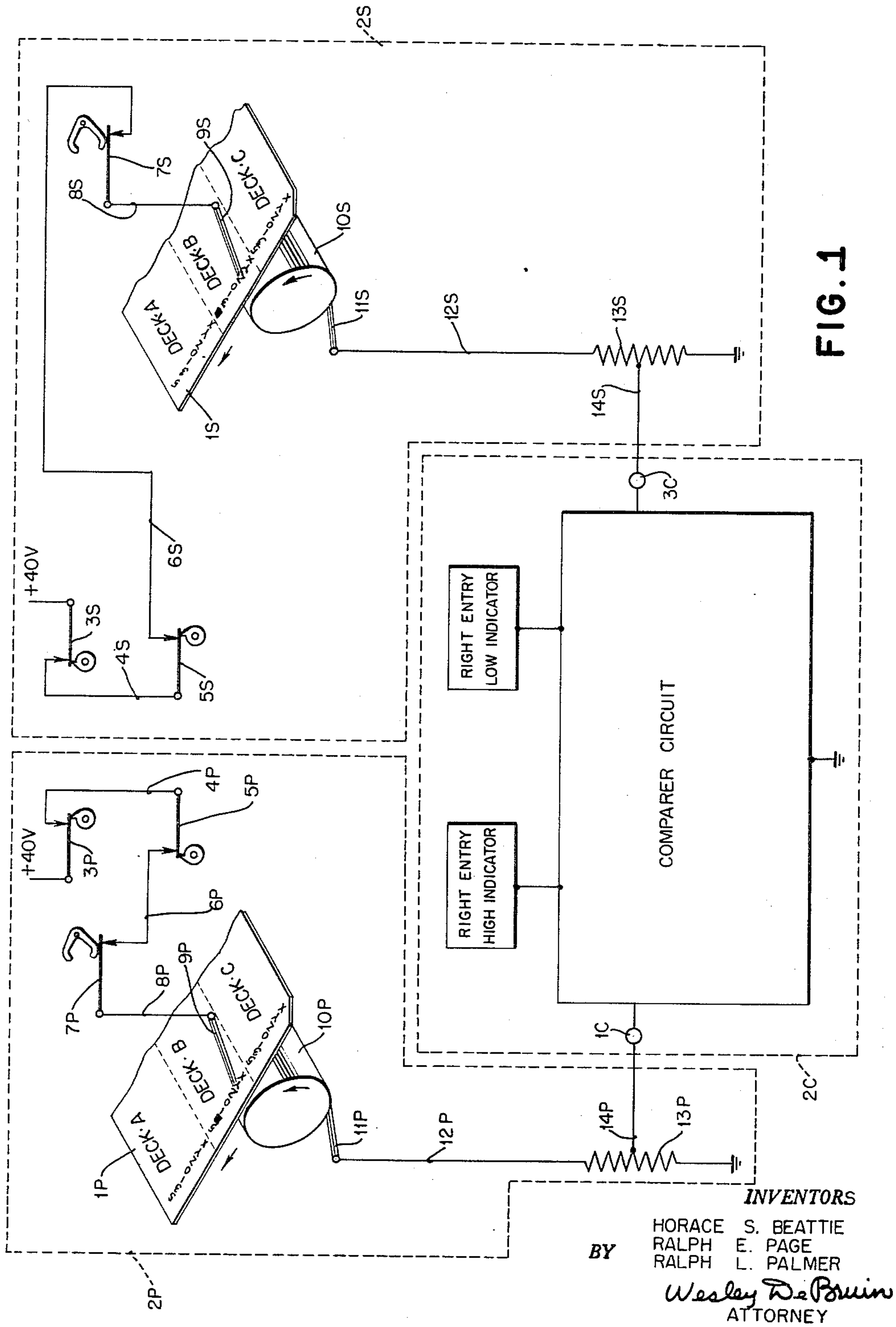

Referring to Fig. 1 it will be seen that partially shown record cards 1P and 1S are identical and each have three decks of record columns; each column having seven index or code positions. The three decks are for convenience referred to and labelled as deck A, deck B, and deck C. Each deck has 60 columns and each column has the following seven card index positions: 5, 3, 1, 0, Z, Y and X. The X, Y and Z positions are referred to as the zone positions; the 0, 1, 3 and 5 positions are referred to as the numeric positions.

One suitable coding arrangement of the numeric group is as follows: digit "zero" is represented by a punched hole in the "0" position; digit "one" is represented by a punched hole in the "1" position; digit "two" is represented by a punched hole in the "0" and "1" positions; digit "three" is represented by a punched hole in the "3" position; digit "four" is represented by punched holes in the "0" and "3" positions; digit "five" is represented by a punched hole in the "5" position; digit "six" is represented by punched holes in the "0" and "5" positions; digit "seven" is represented by punched holes in the "0," "1" and "5" positions; digit "eight" is represented by punched holes in the "3" and "5" positions; and digit "nine" is represented by punched holes in the "0," "3" and "5" positions.

The following table discloses a suitable code for representing alphabetic and special character information:

| Character | Represented by punched holes in the following positions |
|---|---|
| A | X, 0 |
| B | X, 1 |
| C | X, 0, 1 |
| D | X, 3 |
| E | X, 0, 3 |
| F | X, 5 |
| G | X, 0, 5 |
| H | X, 0, 1, 5 |
| I | X, 3, 5 |
| J | X, 0, 3, 5 |
| K | Y, 0 |
| L | Y, 1 |
| M | Y, 0, 1 |
| N | Y, 3 |
| O | Y, 0, 3 |
| P | Y, 5 |
| Q | Y, 0, 5 |
| R | Y, 0, 1, 5 |
| S | Y, 3, 5 |
| T | Y, 0, 3, 5 |
| U | Z, 0 |
| V | Z, 1 |
| W | Z, 0, 1 |
| X | Z, 3 |
| Y | Z, 0, 3 |
| Z | Z, 5 |
| Special Character | Z, 0, 5 |
| Special Character | Z, 0, 1, 5 |
| Special Character | Z, 3, 5 |
| Special Character | Z, 0, 3, 5 |

Still referring to Fig. 1 it will be seen that the block diagram discloses schematically enclosed within broken line 2P a first or primary record card feed and sensing means; enclosed within broken line 2S a second or secondary record card feed and sensing means; and enclosed within broken line 2C a comparer circuit having a "Right Entry High Indicator" and a "Right Entry Low Indicator."

For purpose of explanation, let it now be assumed that record card 1P has a hole punched in the "3" position of the particular column in deck B that is being read by read brush 9P. Further, that the corresponding column of record card 1S has a punched hole in its "5" position. That is, in reading deck B, column 1 of record card 1P read brush 9P will read a punched "3" hole which represents the digit "three," and in reading deck B column 1 of record card 1S read brush 9S will read a punched "5" hole representing the digit "five."

The movement of record card 1P between contact roll 10P and read brush 9P is synchronized with the movement of record card 1S between contact roll 10S and read brush 9S. Card lever contact 7P is closed whenever a primary record card is in position to be read. Card lever contact 7S is closed whenever a secondary record card is in position to be read. Cam contacts 3P and 5P make and break for each primary card index position (i.e., 5, 3, 1, 0, Z, Y and X): at such times within each card index position that when read brush 9P makes contact with contact roll 10P through a punched hole, said read brush neither makes nor breaks the circuit completed. Cam contacts 3S and 5S serve a like function with respect to record card 1S, contact roll 10S, and read brush 9S.

When the selected column of primary record card 1P is being read by read brush 9P, then the selected column of secondary record card 1S is being simultaneously read by read brush 9S. During card index time "3" of deck B a circuit is completed as follows: +40 volt source, cam contact 3P, lead 4P, cam contact 5P, lead 6P, card lever contact 7P, lead 8P, read brush 9P, contact roll 10P, contact brush 11P, lead 12P, and resistor 13P to ground. It will be noted that a portion of the potential impressed across resistor 13P when the afore-recited circuit is completed is transmitted via lead 14P to terminal 1C of comparer circuit 2C. The potential impressed on terminal 1C will be a positive pulse of a duration controlled by the making and breaking of cam contacts 3P and 5P, respectively, for card index position "3" of deck B. The duration of said pulse is not critical and will be somewhat less than card index time "3," where card index time "3" is defined as the time it takes card index position "3" of deck B to pass under the read brush. During card index time "5" of deck B the following circuit is completed and a positive voltage pulse is impressed via lead 14S on terminal 3C of comparer circuit 2C: +40 volt source, cam contacts 3S, lead 4S, cam contact 5S, lead 6S, card lever contact 7S, lead 8S, read brush 9S, contact roll 10S, contact brush 11S, lead 12S and resistor 13S to ground. The comparer circuit 2C, shown in detail in Fig. 3, and explained in detail hereinafter, will by its "Right Entry High Indicator" manifest or indicate that the value read from column 1, deck B, of record card 1S is of higher order than the value read from column 1, deck B, of record card 1P, i.e., digit "five" as compared to digit "three."

Figure 2:
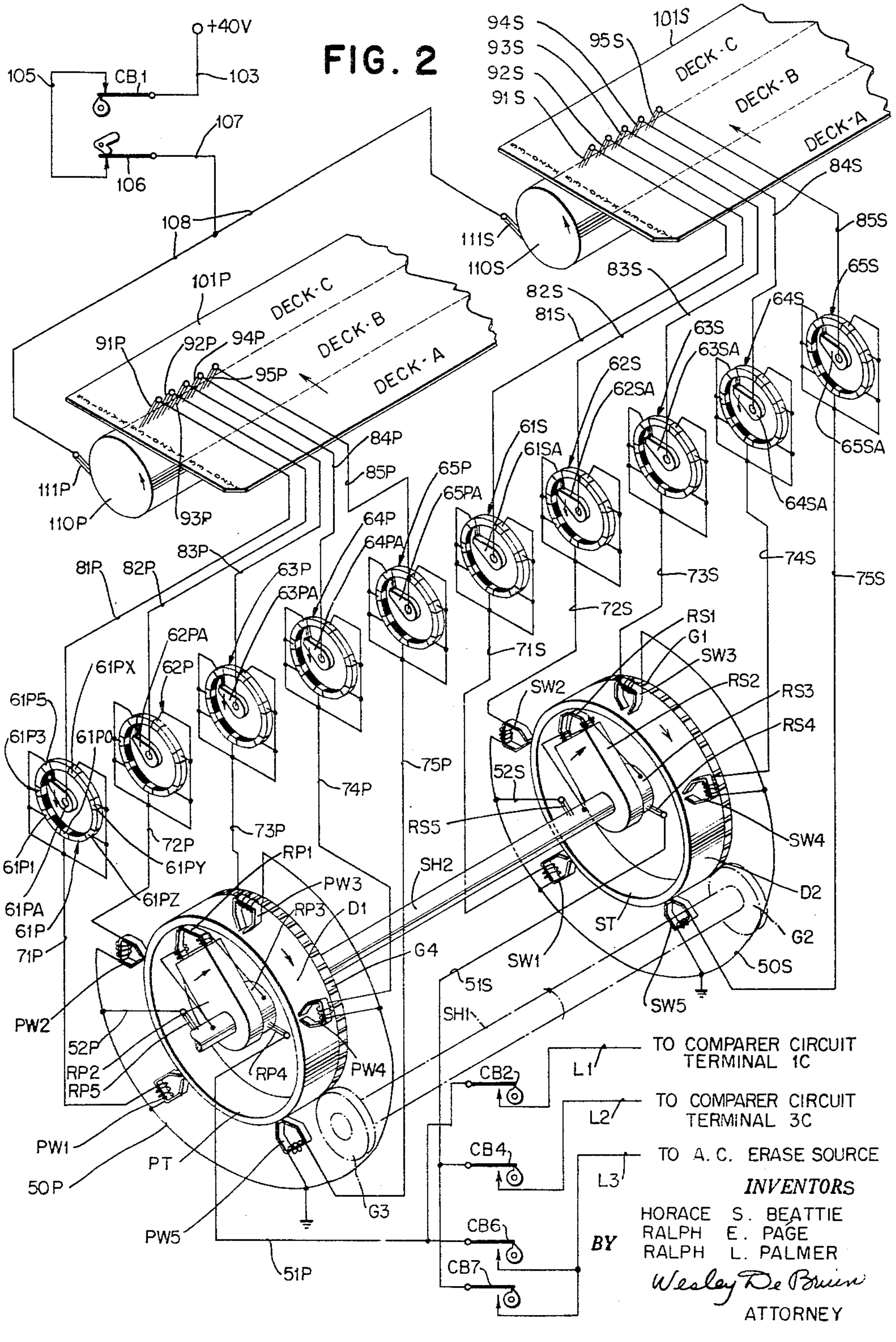
Figure 3A:
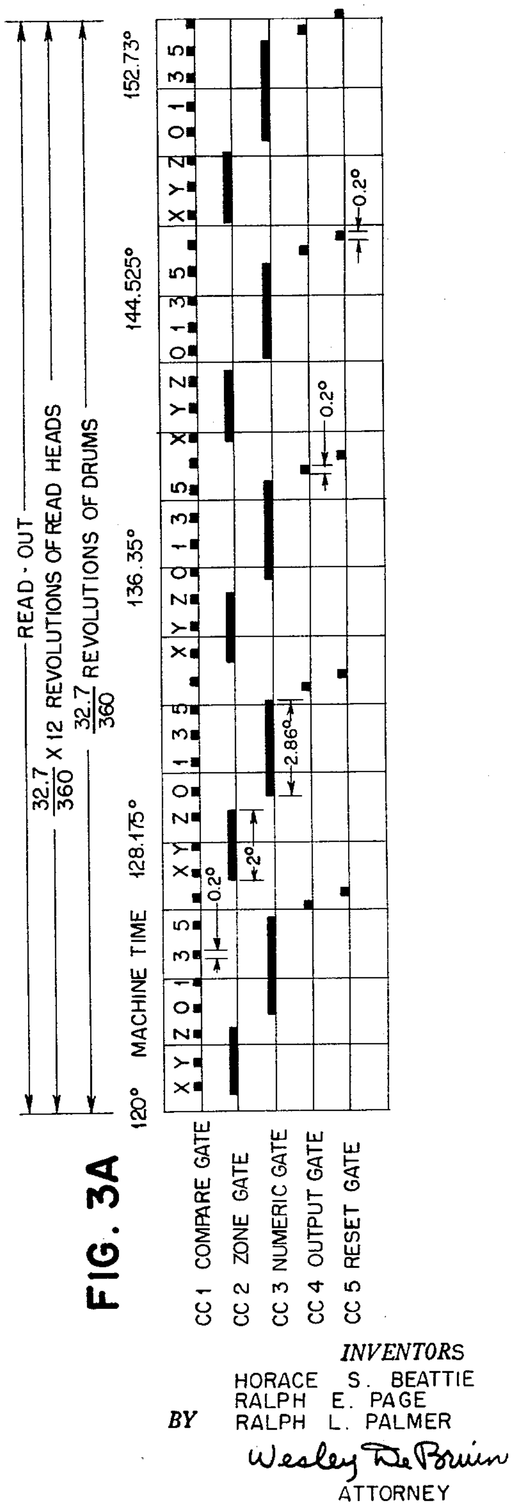
Fig. 3A is a detailed timing chart of read-out time of the novel comparing device disclosed herein. Read-out time is approximately 120° through 152.7° machine time as seen from Fig. 2A.
Figure 3B:
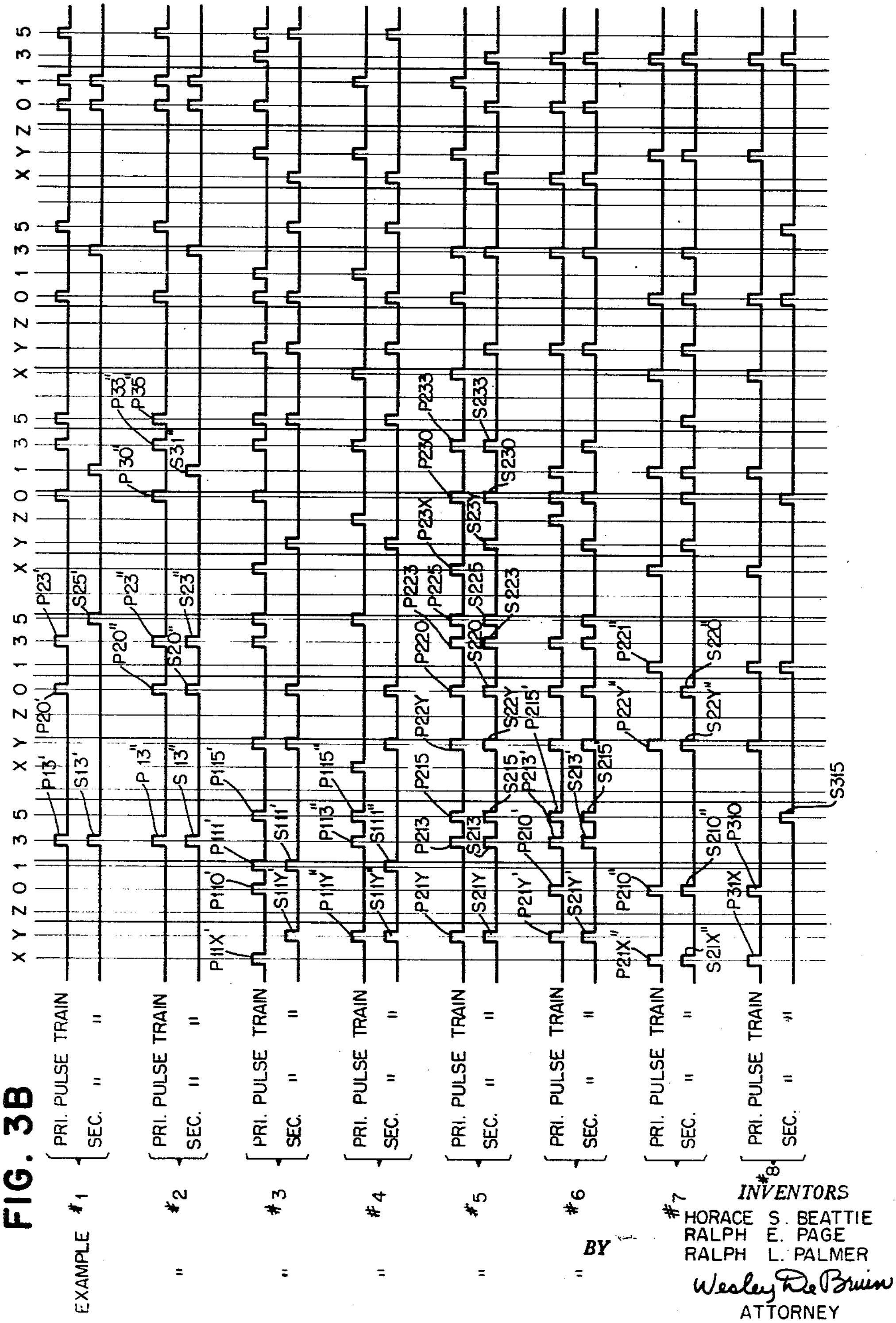
Fig. 3B is a detailed timed showing of the primary pulse train and secondary pulse train of each of the Examples (1 through 8) of operation of the novel comparing device.
Figure 3:
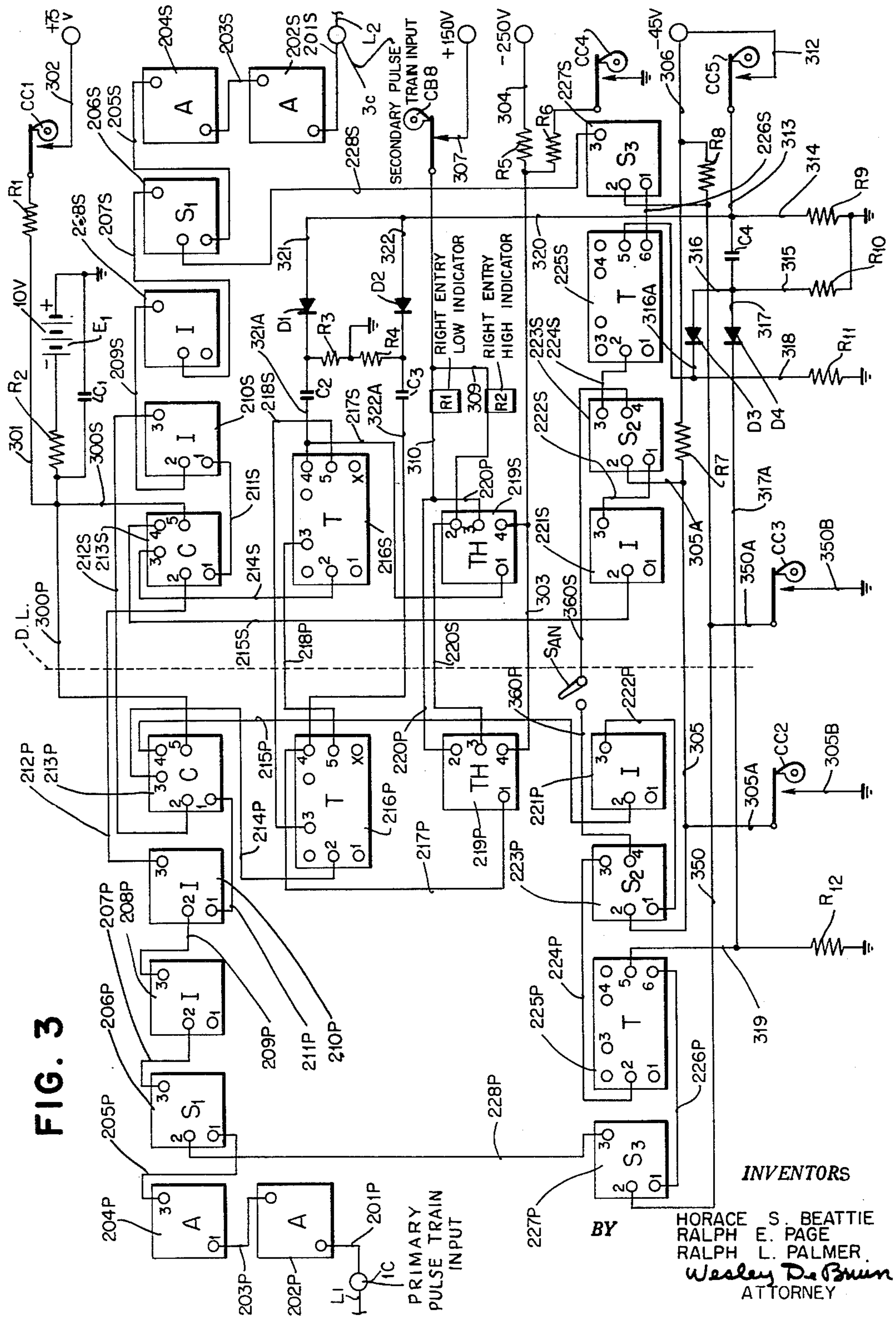

After the comparer circuit of Figs. 1 and 3 is disclosed in detail, hereinafter with reference to the embodiment of Fig. 2, it will be apparent to those skilled in the art how the device disclosed in Fig. 1 could be modified so that N columns of information in a first or primary record card could be compared with N columns of information in a second or secondary record card by utilizing a single comparer circuit, of the type represented by broken line 2C in Fig. 1 and shown in detail in Fig. 3.

THE EMBODIMENT SHOWN IN FIGS. 2 and 3

Referring to Figs. 2 and 3 there is disclosed an embodiment accomplishing the comparing of data stored in five columns of record card 101P with data stored in the corresponding five columns of record card 101S. Record cards 101P and 101S are of the same general type as record cards 1P and 1S of Fig. 1. That is, record cards 101P and 101S each have three decks: each deck having sixty columns, and each column having the following seven card index positions: 5, 3, 1, 0, Z, Y and X. The coding used with record cards 101P and 101S is the same as that disclosed for use with record cards 1P and 1S of Fig. 1.

From Fig. 2 it will be seen that record cards 101P and 101S pass between their respective contact rolls and read brushes in synchronism with index point "5" of deck C being the leading edge.

Each of the ten identical emitters or commutators, namely, 61P, 62P, 63P, 64P, 65P, 61S, 62S, 63S, 64S and 65S, has its rotating arms, namely, 61PA, 62PA, 63PA, 64PA, 65PA, 61SA, 62SA, 63SA, 64SA, and 65SA, connected to the following leads, respectively, 81P, 82P, 83P, 84P, 85P, 81S, 82S, 83S, 84S and 85S. Read brushes 91P, 92P, 93P, 94P and 95P are respectively connected to leads 81P, 82P, 83P, 84P and 85P: read brushes 91S, 92S, 93S, 94S and 95S are respectively connected to leads 81S, 82S, 83S, 84S and 85S.

Since the afore-recited ten commutators of Fig. 2 are identical, function in exact synchronism, and each serves the very same function for a different read brush and write head, only a single commutator, namely 61P, will be disclosed in detail. Commutator 61P has a contact arm 61PA which rotates at a fixed speed (counter-clockwise as viewed in Fig. 2) in synchronism with the passage of record cards 101P and 101S between their respective contact rolls and read brushes. Each commutator has seven conductive bars uniformly displaced about its commutator arm. Each commutator bar extends through an equal arc. The seven commutator bars of each commutator are connected in common. Referring to Fig. 2 it will be seen that the seven commutator bars of commutator 61P are designated by reference characters 61P5, 61P3, 61P1, 61P0, 61PZ, 61PY and 61PX. Each commutator serves the function of making and breaking an electrical circuit which is completed only when its read brush makes contact with the contact roll.

Referring to Fig. 2, the two magnetic drums D1 and D2 each consist of a non-magnetic hub having a thin-walled cylinder of magnetic material overhanging the edge of the hub. It is to be appreciated that the thin-walled cylinder of magnetic material may consist of a non-ferrous material such as brass plated, on one or both sides, with a ferrous material such as nickel cobalt. Still referring to Fig. 2 it will be apparent that the hubs (not shown) respectively carry gears G4 and G1 as well as "thin-walled cylinders of magnetic material" PT and ST. Cylinders PT and ST are for convenience referred to as the "primary magnetic track" and "secondary magnetic track."

Uniformly disposed about the periphery of the primary magnetic track PT are magnetic "write" heads PW1, PW2, PW3, PW4 and PW5; these heads are for convenience referred to as the "primary write heads." Uniformly disposed about the periphery of the second magnetic track ST are magnetic "write" heads SW1, SW2, SW3, SW4 and SW5; these heads are for convenience referred to as the "secondary write heads." Both the primary and secondary write heads are fixed in aligned position and have their respective air gaps very closely spaced or adjacent to their respective magnetic tracks, namely PT and ST.

Disposed within the primary magnetic track is read head RP1; disposed within the secondary magnetic track is read head RS1. Read heads RP1 and RS1 are respectively mounted on members RP2 and RS2 which are carried by shaft SH2. Shaft SH2 is concentrically disposed with respect to magnetic drums D1 and D2, and rotates at a constant speed of 2880 r.p.m. in a clockwise direction as viewed in Fig. 2.

Shaft SH1 has mounted thereon gears G3 and G2 which respectively mesh with gear G4 of magnetic drum D1 and gear G1 of magnetic drum D2. The gear ratio between gears G4 and G3 is the same as the gear ratio betweens gears G1 and G2. Shaft SH1 is driven at a constant speed of such magnitude in a counterclockwise direction as viewed in Fig. 2, that drums D1 and D2 rotate in a clockwise direction at a uniform speed of 240 r.p.m.

In brief: the primary magnetic track and secondary magnetic track rotate in unison at a speed of 240 r.p.m. in a clockwise direction. The primary read head and secondary read head rotate in unison in a clockwise direction at a speed of 2880 r.p.m. The primary write heads and the secondary write heads are fixedly supported in predetermined aligned positions.

From Fig. 2 it will be seen that the air gap of the primary read head RP1 is very closely or adjacently positioned to the internal surface of the primary magnetic track PT. One side of the winding of read head RP1 is connected to shaft SH2. Shaft SH2 is connected to ground through two parallel circuits, namely, brush RP5, lead 52P and lead 50P; and brush RS5, lead 52S and lead 50S. The other side of the winding of read head RP1 is connected to slip ring RP3, which is carried by and insulated from shaft SH2. One side of cam contacts CB2 and CB6 are connected through lead 51P and brush RP4 to slip ring RP3.

The air gap of the secondary read head RS1 is very closely or adjacently positioned to the internal surface of the secondary magnetic track ST. One side of the winding of read head RS1 is connected to shaft SH2. The other side of the winding of read head RS1 is connected to slip ring RS3, which is carried by and insulated from shaft SH2. One side of cam contacts CB4 and CB7 are connected through lead 51S and brush RS4 to slip ring RS3.

The recording field may be transverse, perpendicular or longitudinal with respect to the magnetic recording medium which in this instance is a magnetic track. The magnetic tracks PT and ST may be constructed of "Cunife tape" having a thickness of approximately .0015 inch and an effective width of approximately 1/32 of an inch. The primary and secondary read and write heads may be of a design well known in the art.

Referring now to Fig. 3 the comparer circuit is shown in block diagram form. As set forth earlier herein the detailed circuits represented by each block in Fig. 3 are shown in Figs. 4A through 4H.

Again, referring to Fig. 3 contacts CC1, CC2, CC3, CC4 and CC5 may be of the cam type or the commutator type either of which are well known in the art. Fig. 3A discloses the timing of the above-recited contacts. The timing of cam contact CB8, shown in Fig. 3, is disclosed in Fig. 2A. The timing of cam contacts CB1, CB2, CB4, CB6 and CB7, respectively shown in Fig. 2, is set forth in Fig. 2A.

In the circuit of Fig. 3, namely the comparer circuit, relay coil R–1 corresponds to the "Right Entry Low Indicator" of Fig. 1, and relay coil R–2 corresponds to the "Right Entry High Indicator" of Fig. 1.

Record cards 101P and 101S of Fig. 2 move at a uniform synchronized speed between their respective contacts rolls and read brushes. During the time that it takes for deck C of record card 101P to pass between contact roll 110P and read brushes 91P, through 95P and deck C of record card 101S to pass between contact roll 110S and read brushes 91S through 95S, the arms of commutators 61P through 65P and 61S through 65S make one synchronized revolution. That is, during the time that card index position "5" of deck C of record cards 101P and 101S are respectively being read the commutator arms 61PA through 65PA and 61SA through 65SA make and break contact respectively with the first segment of their respective commutators, i.e., the segment 61P5 of commutator 61P and corresponding segments of commutators 62P through 65P and 61S through 65S. Likewise, during the reading of card index position "3" the commutator arms make and break contact with the second segment of their respective commutators, i.e., segment 61P3 of commutator 61P and the corresponding segments as to the remaining nine commutators. Each commutator has seven bars and each record card deck has seven positions, namely 5, 3, 1, 0, Z, Y, and X. Each commutator arm makes and breaks with a commutator bar during the reading of each card index position of each deck.

The speed of rotation of drums D1 and D2 is 240 r.p.m. and said drums complete one-fifth of a revolution during the reading of one deck of record cards 101P and 101S respectively. There are five primary write heads uniformly disposed about the primary magnetic track PT. Each primary write head accomplishes the writing of magnetic pulses upon the primary magnetic track in accordance (i.e. spaced relationship) with the "punched holes" existing in the record card column corresponding thereto. That is, in one-fifth of a revolution of drum D1 five record card columns of information are written in serial by column order upon primary magnetic track PT. The same relationships, which will be more clear after the detailed examples set forth hereinafter, exist as to the secondary write heads and secondary track ST.

For convenience, let the primary and secondary magnetic tracks be respectively represented by thin-walled cylinders viewed from the left in Fig. 2. The primary and secondary magnetic tracks are then respectively shown in Figs. 5A and 6A.

Figure 5A:
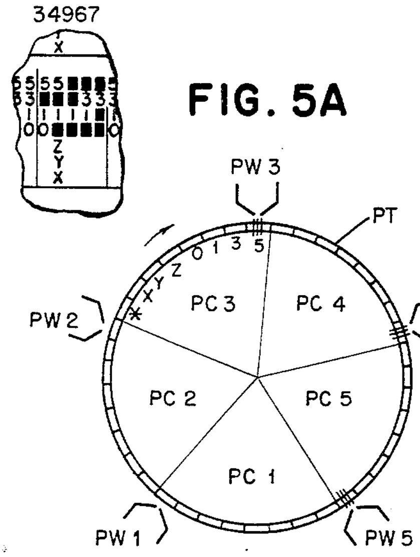
Fig. 5A is a simplified showing of primary magnetic track PT at read-in time "5" under the conditions of Example No. 1.

From Fig. 5A it will be seen that the primary magnetic track is arbitrarily divided into five segments, each consisting of 72 mechanical degrees. The five segments of the primary magnetic track are labelled PC1, PC2, PC3, PC4 and PC5. Each segment has eight cells; each cell being capable of storing one magnetic bit of information. The eight cells of each segment are, for convenience, labelled as follows, 5, 3, 1, 0, Z, Y, X and *. Segment PC1 of the primary magnetic track accomplishes the storing of the information stored in the highest order column of the primary record card. Segment PC2 of the primary magnetic track accomplishes the storing of the information stored in the second highest order column of the primary record card. Segment PC3 of the primary magnetic track accomplishes the storing of the information stored in the third highest order column of the primary record card. Segment PC4 of the primary magnetic track accomplishes the storing of the information stored in the fourth highest order column of the primary record card. Segment PC5 of the primary magnetic track accomplishes the storing of the information stored in the fifth highest order column of the primary record card. Segments SC1, SC2, SC3, SC4 and SC5 of the secondary magnetic track correspond respectively with segments PC1, PC2, PC3, PC4 and PC5 of the primary magnetic track and perform a like function with respect to the information obtained from the secondary record card.

Also, throughout, and the following examples in particular, a voltage pulse is a shift in voltage. The pulse is a positive pulse if the voltage shift is in a positive direction, regardless of the original and final voltage values. Likewise, a negative pulse represents a voltage shift in a negative direction, regardless of the original and final voltages values. The voltage change is the amplitude of the pulse.

*Example No. 1*

From the following example the operation of the device disclosed in Figs. 2 and 3 will appear more clearly. Merely for purpose of explanation let the following conditions be assumed: The number represented by punched holes in the first five columns of deck B record card 101P is to be compared with the number represented by punched holes in the first five columns of deck B of record card 101S. The number represented by punched holes in the first five columns of deck B of primary record card 101P is 34967: the number represented by punched holes in the first five columns of deck B of secondary record card 101S is 35132. Hence it follows that the first five columns of deck B of primary record card 101P have the following punched holes: column one the "3" position; column two the "0" and "3" positions; column three of the "0", "3" and "5" positions; column four the "0" and "5" positions; and column five the "0," "1" and "5" positions. Further, it follows that the first five columns of deck B of secondary record card 101S have the following punched holes: column one the "3" position; column two the "5" position; column three the "1" position; column four the "3" position; and column five the "0" and "1" positions.

Figure 2A:
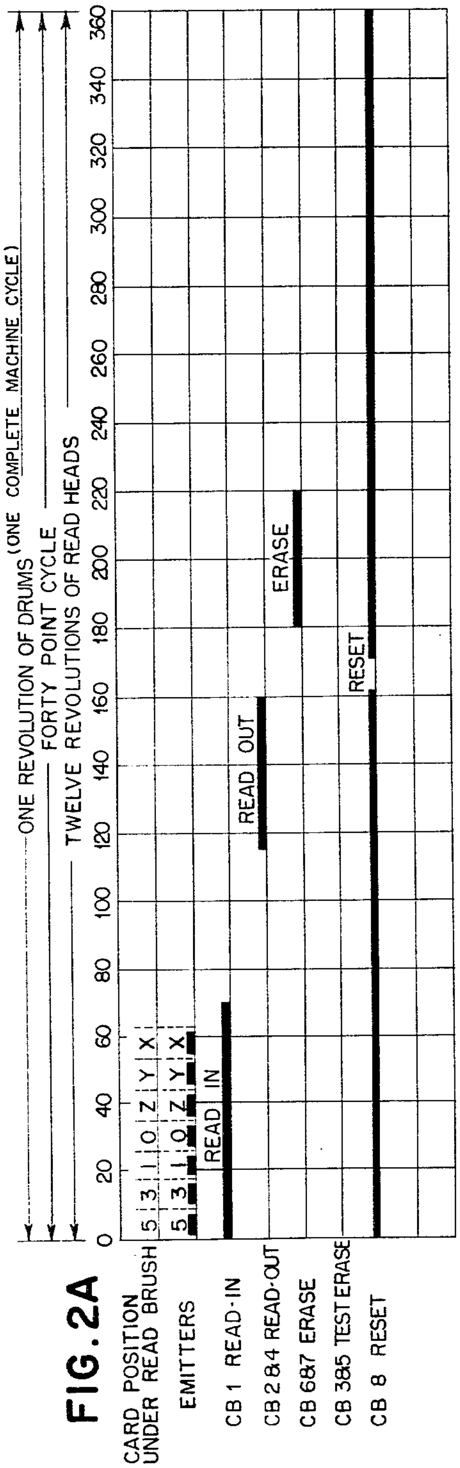

Now referring to the timing chart shown in Fig. 2A, it is to be noted that during the first cycle point, namely machine time zero through nine degrees, card index position "5" of deck B of primary and secondary record cards 101P and 101S, respectively, pass beneath their respective read brushes and contact roll. Card index position "3" of deck B of primary and secondary record cards 101P and 101S is read during machine time ten degrees through eighteen degrees; i.e., cycle point two. In like manner referring to deck B of primary and secondary record cards 101P and 101S, respectively: card index position "1" is read during machine time nineteen through twenty-seven degrees; card index position "0" is read during machine time twenty-eight through thirty-six degrees; card index position "Z" is read during machine time thirty-seven through forty-five degrees; card index position "Y" is read during machine time forty-six through fifty-four degrees; and card index position "X" is read during machine time fifty-five through sixty-three degrees. From a further inspection of the timing chart of Fig. 2A it will be seen that read-in cam CB1 is closed for the first eight cycle points, namely, the first seventy-two degrees of the machine cycle. That is, during read-in time, drums D1 and D2 respectively rotate through seventy-two degrees, i.e., one-fifth of a revolution. It is to be recalled at this point that the primary and secondary write heads are stationary and are displaced each through an angle of seventy-two degrees about the periphery of their respective magnetic tracks.

From the legend appearing above Fig. 2A it will be apparent that while drums D1 and D2 make one complete revolution the read heads RP1 and RS1 make twelve complete revolutions and the novel magnetic comparing device completes one complete cycle consisting of 360 degrees machine time. Hence if nine degrees of a machine cycle constitutes a cycle point then the device herein disclosed can be said to be a forty cycle point machine.

*Read-in* (*Example No. 1*).—During "read in" time, namely, machine time zero through seventy-two degrees the following sequence of operation takes place. As seen from Fig. 2A, cam contact CB1 closes at zero degrees and opens at seventy-two degrees machine time.

Figure 6A:
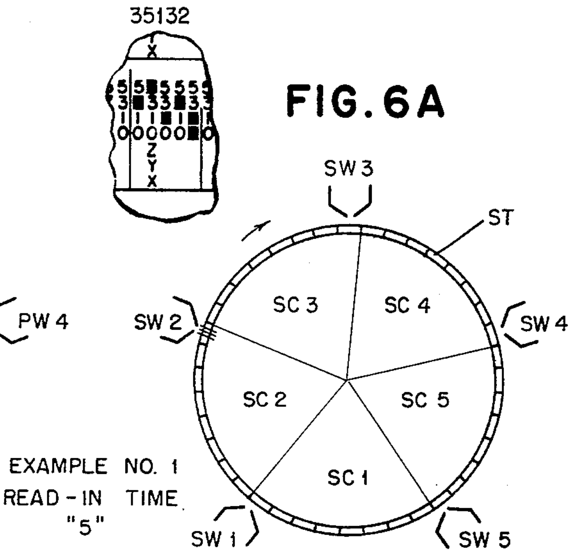
Fig. 6A is a simplified showing of secondary magnetic track ST at read-in time "5" under the conditions of Example No. 1.

*Read-in, card index position "5" of deck B.*—Now during the first machine cycle point, namely, zero through nine degrees, card index position "5" of deck B of primary and secondary record cards 101P and 101S, is read. Now it is to be recalled that in accordance with Example No. 1 there is a punched hole in the "5" position of the following columns: three, four and five of deck B of primary record card 101P; and two of deck B of secondary record card 101S. Therefore, during the reading of card index position "5" the following circuits are completed for a short interval of time: +40 volt source, lead 103, cam contact CB1, lead 105, card lever contact 106, lead 107, lead 108, contact brush 111P, contact roll 110P, read brush 93P, lead 83P, commutator arm 63PA, commutator bar 63P5, lead 73P, primary write head PW3, and lead 50P to ground: +40 volt source, lead 103, cam contact CB1, lead 105, card lever contact 106, lead 107, lead 108, contact brush 111P, contact roll 110P, read brush 94P, lead 84P, commutator arm 64PA, commutator bar 64P5, lead 74P, primary write head PW4, and lead 50P to ground: +40 volt source, lead 103, cam contact CB1, lead 105, card lever contact 106, lead 107, lead 108, contact brush 111P, contact roll 110P, read brush 95P, lead 85P, commutator arm 65PA, commutator bar 65P5, lead 75P, primary write head PW5 and lead 50P to ground: and +40 volt source, lead 103, cam contact CB1, lead 105, card lever contact 106, lead 107, lead 108, contact brush 111S, contact roll 110S, read brush 92S, lead 82S, commutator arm 62SA, commutator bar 62S5, lead 72S, secondary write head SW2, and lead 50S to ground. The above circuits are made for an interval of short duration within machine cycle point one, i.e., card index time "5," and result in primary write heads PW3, PW4, PW5 and secondary write head SW2, respectively, magnetizing small areas, i.e., storing magnetic bits, on their respective magnetic tracks. From an inspection of Figs. 2 and 5A it will be apparent that the magnetic spots or bits written on primary magnetic track PT as a result of the punched "5" holes appearing in columns three, four and five of deck B of record card 101P, are displaced from each other by an angle of approximately seventy-two degrees. Further it is to be kept in mind that during machine cycle point one primary magnetic track PT and secondary magnetic track ST each rotate in unison through an angle of nine degress machine time. Fig. 6A shows the bit stored in secondary magnetic track ST during cycle point one.

Figure 5B:
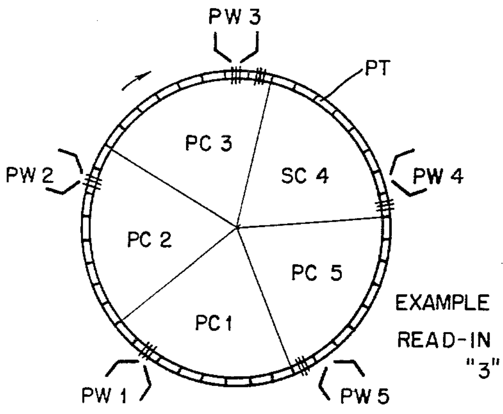
Fig. 5B is a simplified showing of primary magnetic track PT at read-in time "3" under the conditions of Example No. 1.
Figure 6B:
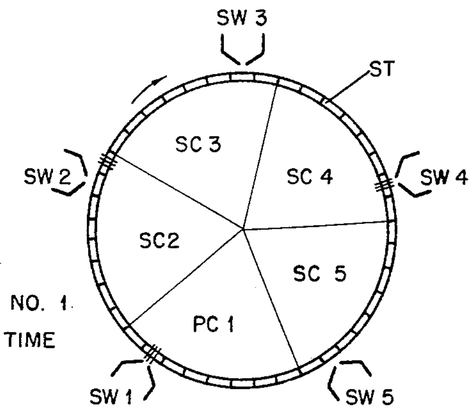
Fig. 6B is a simplified showing of secondary magnetic track ST at read-in time "3" under the conditions of Example No. 1.

*Read-in, card index position "3" of deck B.*—In accordance with Example No. 1 there is a punched "3" hole in the following columns: one, two and three of deck B of primary record card 101P; and one and four of deck B of secondary record card 101S. Now during the second machine cycle point, namely, ten through eighteen degrees machine time, card index position "3" of deck B of primary and secondary record cards 101P and 101S is read. For a short duration, during the reading of card index position "3" a plurality of circuits corresponding to those set forth above in detail are completed. These circuits are respectively completed through primary write heads PW1, PW2 and PW3, and secondary write heads SW1 and SW4. Due to the above circuits being completed for a short interval during read-in time "3" small discrete displaced areas of the primary magnetic and secondary magnetic track are magnetized. Reference is made to Figs. 5B and 6B of the drawings.

Figures 5C, 6C:
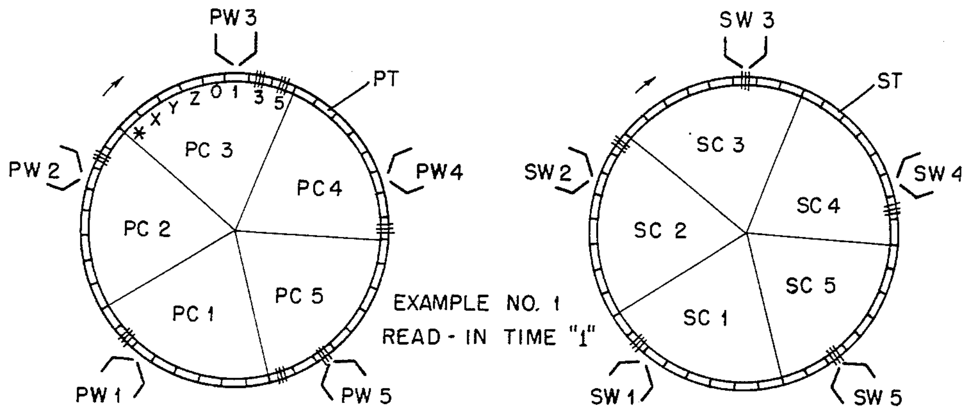
Fig. 5C is a simplified showing of primary magnetic track PT at read-in time "1" under the conditions of Example No. 1.
Fig. 6C is a simplified showing of secondary magnetic track ST at read-in time "1" under the conditions of Example No. 1.

*Read-in, card index position "1" of deck B.*—In accordance with Example No. 1 there is a punched "1" hole in the following columns: five of primary record card 101P; and three and five of secondary record card 101S. During the third machine cycle point, namely, nineteen through twenty-seven degrees machine time, card index position "1" of deck B of primary and secondary record cards 101P and 101S is read. For a short interval of time during the reading of card index position "1" the circuits are completed through primary write head PW5 and secondary write heads SW3 and SW5. Reference is made to Figs. 5C and 6C of the drawing.

Figures 5D, 6D:
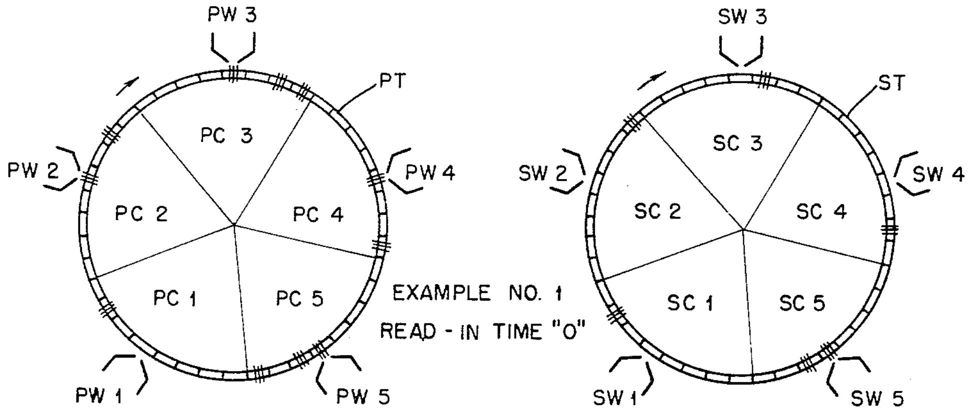
Fig. 5D is a simplified showing of primary magnetic track PT at read-in time "0" under the conditions of Example No. 1.
Fig. 6D is a simplified showing of secondary magnetic track ST at read-in time "0" under the conditions of Example No. 1.

*Read-in, card index position "0" of deck B.*—In conformity with Example No. 1 there is a punched hole in the "0" position of the following columns: two, three, four and five of deck B of primary record card 101P; and five of deck B of secondary record card 101S. Therefore, during the reading of card index position "0," namely, the fourth machine cycle point, i.e., twenty-eight through thirty-six degrees machine time, circuits are completed for a short interval of time: through primary write heads PW2, PW3, PW4 and PW5 and secondary write head SW5. Reference is made to Figs. 5D and 6D.

*Read-in, card index position "Z" of deck B.*—During the fifth machine cycle point, namely, thirty-seven through forty-five degrees machine time, card index position "Z" of deck B of primary and secondary record cards 101P and 101S is read.

Figures 5E, 6E:
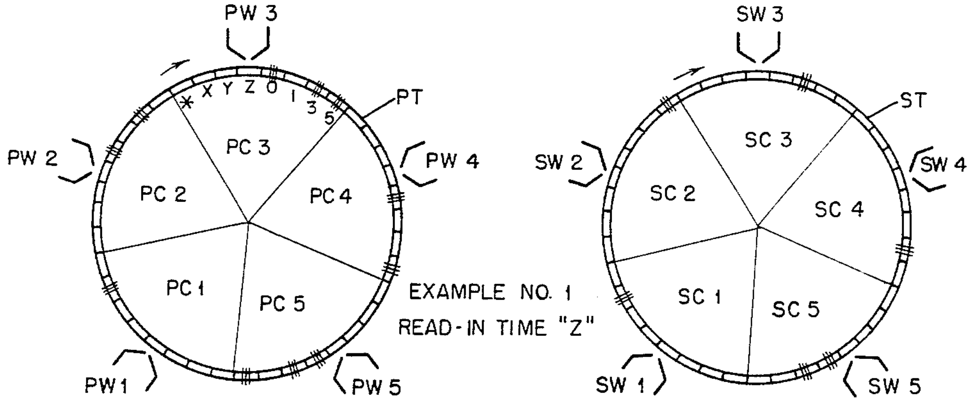
Fig. 5E is a simplified showing of primary magnetic track PT at read-in time "Z" under the conditions of Example No. 1.
Fig. 6E is a simplified showing of secondary magnetic track ST at read-in time "Z" under the conditions of Example No. 1.

In accordance with Example No. 1 there are no punched holes in the "Z" position of record card columns one through five of deck B of primary and secondary record cards 101P and 101S, respectively. Hence, there will not be any primary or secondary write head circuits completed during this machine cycle point. Reference is made to Figs. 5E and 6E of the drawing.

Figures 5F, 6F:
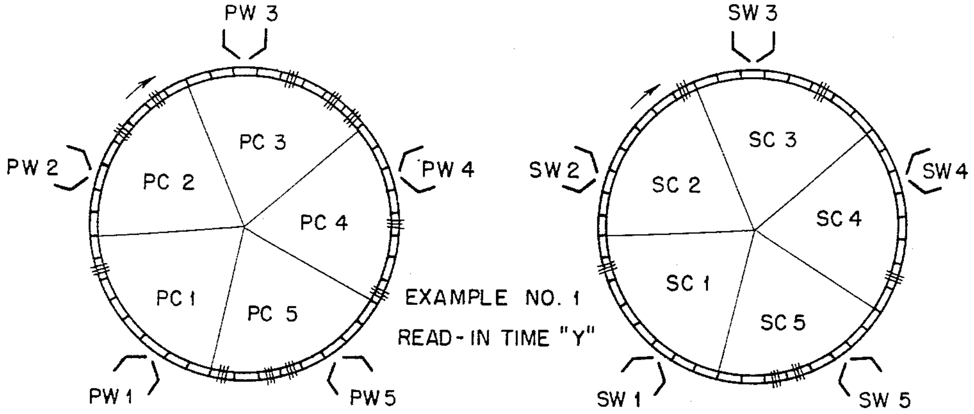
Fig. 5F is a simplified showing of primary magnetic track PT at read-in time "Y" under the conditions of Example No. 1.
Fig. 6F is a simplified showing of secondary magnetic track ST at read-in time "Y" under the conditions of Example No. 1.

*Read-in, card index position "Y" of deck B.*—During the sixth machine cycle point, namely, forty-six through fifty-four degrees machine time, card index position "Y" of deck B of primary and secondary record cards 101P and 101S is read. In accordance with Example No. 1 there are no punched holes in the "Y" position of record card columns one through five of deck B of primary and secondary record cards 101P and 101S, respectively. Hence, there will not be any primary or secondary write head circuits completed during this machine cycle point. Reference is made to Figs. 5F and 6F of the drawing.

Figures 5G, 6G:
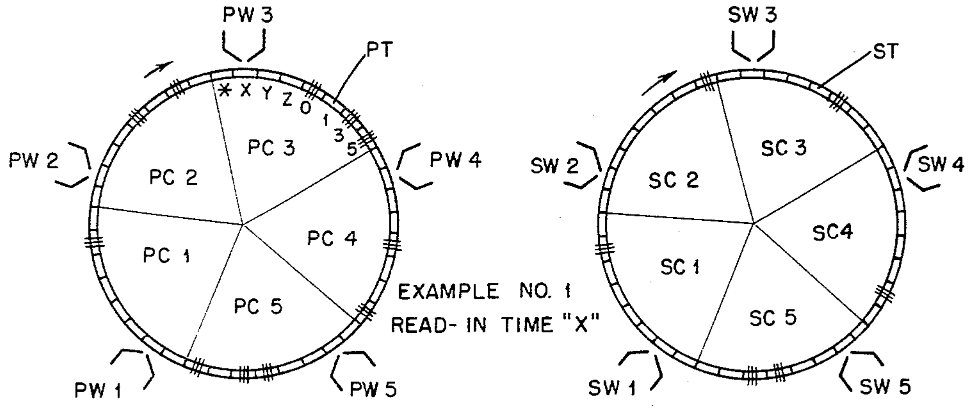
Fig. 5G is a simplified showing of primary magnetic track PT at read-in time "X" under the conditions of Example No. 1.
Fig. 6G is a simplified showing of secondary magnetic track ST at read-in time "X" under the conditions of Example No. 1.
Figures 5H, 6H:
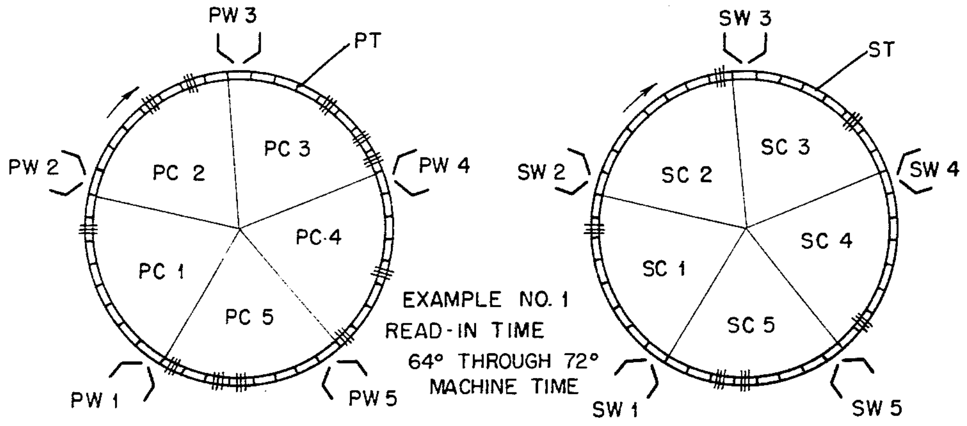
Fig. 5H is a simplified showing of primary magnetic track PT at read-in time 64° through 72° machine time, under the conditions of Example No. 1.
Fig. 6H is a simplified showing of secondary magnetic track ST at read-in time 64° through 72° machine time under the conditions of Example No. 1.

*Read-in, card index position "X" of deck B.*—During the seventh machine cycle point, namely, fifty-five through sixty-three degrees machine time, card index position "X" of deck B of primary and secondary record cards 101P and 101S is read. In accordance with Example No. 1 there are no punched holes in the "X" position of record card columns one through five of deck of primary and secondary record cards 101P and 101S, respectively. Hence, there will not be any primary or secondary write head circuits completed during this machine cycle point. Reference is made to Figs. 5G and 6G of the drawing.

*Read-out—Example No. 1.*—Referring to Fig. 2A which is a timing chart for the complete machine cycle consisting of forty cycle points it will be seen that cam contacts CB2 and CB4 are closed during read-out time, namely, one hundred and fifteen through one hundred and sixty degrees machine time. From Figs. 2 and 3 it will be seen that one side of cam contact CB2 (Fig. 2) is connected through lead L1 to terminal 1C (Fig. 3) and that one side of cam contact CB4 (Fig. 2) is connected through lead L2 to terminal 3C (Fig. 3).

From Fig. 2 it will be seen that one side of the winding of primary read head RP1 is connected through shaft SH2, brush RP5, lead 52P, and lead 50P to ground. The other side of the winding of primary read head RP1 is connected through slip ring RP3, brush RP4 and lead 51P to the other side of cam contact CB2. Thus, when can contact CB2 is closed the voltage pulses read by primary read head RP1 will be impressed via lead L1 on terminal 1C of the comparer circuit of Fig. 3.

Still referring to Fig. 2 it will be seen that one side of the winding of secondary read head RS1 is connected through shaft SH2, brush RS5, lead 52S, and lead 50S to ground. The other side of the winding of secondary read head RS1 is connected through slip ring RS3, brush RS4 and lead 51S to the other side of cam contact CB4. Thus, when cam contact CB4 is closed the voltage pulses read by secondary read head RS1 will be impressed via lead L2 on terminal 3C of the comparer circuit of Fig. 3.

Figures 5I, 6I, 7, 8:
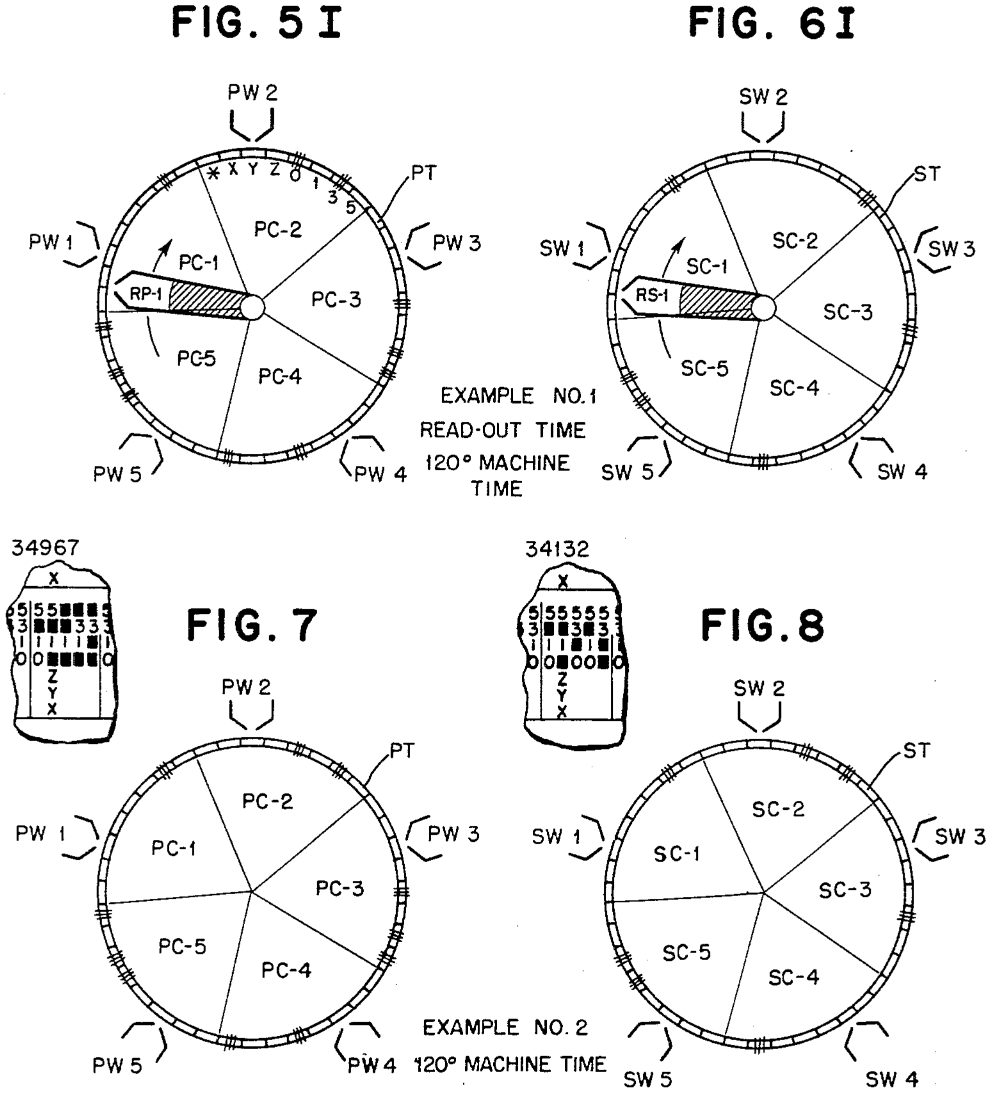
Fig. 5I is a simplified showing of primary magnetic track PT at (read-out time) approximately 120° machine time under the conditions of Example No. 1.
Fig. 6I is a simplified showing of secondary magnetic track ST at approximately (read-out time) 120° machine time under the conditions of Example No. 1.
Fig. 7 is a simplified showing of primary magnetic track PT at (read-out time) approximately 120° machine time under the conditions of Example No. 2.
Fig. 8 is a simplified showing of secondary magnetic track ST at (read-out time) approximately 120° machine time under the conditions of Example No. 2.

Now referring to Figs. 5I and 6I it will be seen that at the beginning of "Read-Out Time," namely, machine time one hundred and twenty degrees, primary read head RP1 is about to read the "X" cell of segment PC1 of drum D1 and secondary read head RS1 is about to read the "X" cell of segment SC1 of drum D2. It will be recalled that drums D1 and D2 rotate in synchronism at approximately 240 r.p.m. in a clockwise direction as viewed throughout the drawing, and that primary read head RP1 and secondary read head RS1 rotate in synchronism at approximately 2880 r.p.m. also in a clockwise direction as viewed throughout the drawing. Hence, it will be appreciated that all the information stored in the primary magnetic track PT of drum D1 is read by primary read head RP1, and all the information stored in the secondary magnetic track ST of drum D2 is read by secondary read head RS1, simultaneously in an interval of time equal to approximately 32.73° machine time. Reference is made to the machine timing chart shown in Fig. 2A and the read-out timing chart shown in Fig. 3A. It will be noted that read-out time consists effectively of 120° through 152.73° machine time.

Again referring to Fig. 5I and in accordance with Example No. 1 it will be apparent that primary read head RP1 will deliver a train of voltage pulses as a result of reading the information (i.e., bits) magnetically stored in the following cells of primary magnetic track PT of drum D1: cell 3 of segment PC1; cells 0 and 3 of segment PC2; cells 0, 3 and 5 of segment PC3; cells 0 and 5 of segment PC4; and cells 0, 1 and 5 of segment PC5. This pulse train may for convenience be referred to as the primary pulse train of Example No. 1 and is shown chronologically with respect to read-out time in Fig. 3B of the drawing. Fig. 3B of the drawing is to be viewed in conjunction with Fig. 3A of the drawing.

Again referring to Fig. 6I and in accordance with Example No. 1 it will be apparent that secondary read head RS1 will deliver a train of voltage pulses as a result of reading the information (i.e., bits) magnetically stored in the following cells of secondary magnetic track ST of drum D2: cell 3 of segment SC1; cell 5 of segment SC2; cell 1 of segment SC3; cell 3 of segment SC4; and cells 0 and 1 of segment SC5. This pulse train may for convenience be referred to as the secondary pulse train of Example No. 1 and is shown chronologically with respect to read-out time and the primary pulse train of Example No. 1 in Fig. 3B of the drawing.

It is to be recalled that through the circuitry set forth in detail supra, the primary pulse train of Example No. 1 is impressed on terminal 1C of the comparer circuit, and the secondary pulse train of Example No. 1 is impressed on terminal 3C of the comparer circuit.

*The comparer circuit—Example No. 1.*—Referring to Fig. 3 it will be noted that the comparer circuit is substantially symmetrically disposed about the vertical dotted line D.L. For purpose of explanation the comparer circuit may be thought of as having a left portion (the portion to the left of dotted line D.L. in Fig. 3) and a right portion (the portion to the right of dotted line D.L. in Fig. 3). From Fig. 3 it will be seen that the left portion of the comparer circuit includes primary pulse train input terminal 1C and the right portion of the comparer circuit includes secondary pulse train input terminal 3C.

Now referring to the read-out timing chart of Figs. 3A and 3B and in particular to the primary pulse train and the secondary pulse train of Example No. 1, it will be seen that pulse P13′ of the primary pulse train is in exact synchronism with pulse S13′ of the secondary pulse train. Pulse P13′ is impressed on terminal 1C and via lead 201P on the input terminal of amplifier 202P. The amplified positive pulse which emerges from the output terminal of amplifier 202P is impressed via lead 203P on the input terminal of amplifier 204P. The positive pulse emerging from the output terminal of amplifier 204P is impressed via lead 205P on terminal 1 of electronic switch 206P. Terminal 2 of switch 206P is connected via lead 228P to terminal 3 of switch 227P. Switch 227P is non-conductive at this time, as will be apparent from the discussion which follows with respect to subsequent examples. When switch 227P is non-conductive then terminal 2 of switch 206P is conditioned (i.e. has the higher of two positive potentials impressed on it) and thus when the positive pulse from the output terminal of amplifier 204P is impressed on terminal 1 of switch 206P a negative pulse appears at terminal 3 of switch 206P. This negative pulse is impressed via lead 207P on input terminal 2 of inverter switch 208P, resulting in a positive pulse appearing at terminal 3 of inverter switch 208P. The positive pulse appearing at terminal 3 of inverter switch 208P is impressed via lead 209P on terminal 2 of inverter switch 210P and results in a positive pulse from terminal 1 of inverter switch 210P being impressed via lead 211P on terminal 1 of comparer switch 213P and also a negative pulse from terminal 3 of inverter switch 210P being impressed via lead 212P on terminal 2 of comparer switch 213S.

Now it is to be recalled that secondary pulse S13′ is impressed on secondary pulse train input terminal 3C in exact synchronism with the application of primary pulse P13′ on primary pulse train input terminal 1C. Further, it is to be observed that amplifiers 202S and 204S, switch 206S, inverter switches 208S and 210S, and comparer switch 213S of the right portion of the comparer circuit are interconnected in identical manner, correspond to, and thus function in response to secondary positive pulse S13′ in the identical manner that amplifier 202P and 204P, switch 206P, inverter switches 208P and 210P and comparer switch 213P of the left portion of the comparer circuit function in response to positive pulse P13′. Now it will be recalled that as a result of positive pulse P13′ a positive pulse is impressed on terminal 1 of comparer switch 213P and a negative pulse is impressed on terminal 2 of comparer switch 213S. In like manner it is now apparent that secondary positive pulse S13′ results in a positive pulse being impressed on terminal 1 of camparer switch 213S and a negative pulse being impressed on terminal 2 of comparer switch 213P.

From Fig. 3 it will be seen that terminal 5 of comparer switch 213P is connected through lead 300P and lead 300S to terminal 5 of comparer switch 213S and that the juncture of leads 300P and 300S is connected to a parallel circuit one leg of which is connected through resistor $R_2$ to a ten volt negative potential, and the second leg of which is connected through lead 301, and resistor $R_1$ to one side of commutator contact CC1. The other side of commutator contact CC1 has impressed on it a positive potential of seventy-five volts. Now from the read-out timing chart of Fig. 3A, where the timing of commutator contact CC1 is shown, it will be noted that said contact closes at all possible times at which a primary voltage pulse and, or a secondary voltage pulse could occur. When commutator contact CC1 is closed a potential of approximately positive sixty-five volts is impressed on terminal 5 of comparer switches 213P and 213S, respectively.

Comparer switches 213P and 213S are identical. From Fig. 4D it will be seen that in order for comparer switch 213P or 213S to be conductive it must have simultaneously impressed upon each of its terminals 1, 2 and 5 positive pulses of sufficient magnitude. Therefore, since primary positive pulse P13′ results in a negative pulse being impressed on terminal 2 of comparer switch 213S, and secondary positive pulse S13′ results in a negative pulse being impressed on terminal 2 of comparer switch 213P, it may be said that primary pulse P13′ disables comparer switch 213S and that secondary pulse S13′ disables comparer switch 213P. Since neither comparer switch 213P nor 213S is rendered conductive as a result of the simultaneous occurrence of positive pulses P13′ and S13′ the remaining portion of the entire comparer circuit of Fig. 3 is in no way affected by said pulses.

Now again referring to Fig. 3A it will be seen that primary pulse P20′ occurs at approximately 130° machine time and that there is no secondary pulse corresponding in time to primary pulse P20′. Amplifiers 202P and 204P, switch 206P and inverter switches 208P and 210P function in response to primary positive pulse P20′ exactly as explained with respect to primary positive pulse P13′. Hence it is seen that as a result of the application of pulse P20′ on primary pulse train input terminal 1C a positive voltage pulse is impressed on terminal 1 of comparer switch 213P and a negative voltage pulse is impressed on terminal 2 of comparer switch 213S. When the positive voltage pulse is impressed on terminal 1 of comparer switch 213P there is already impressed on terminal 2 of comparer switch 213P a positive potential since inverter switch 210S is non-conductive. From Fig. 3A it will also be seen that commutator contact (compare gate) CC1 closes for an interval in machine time within the duration of pulse P20′.

Figure 4A:
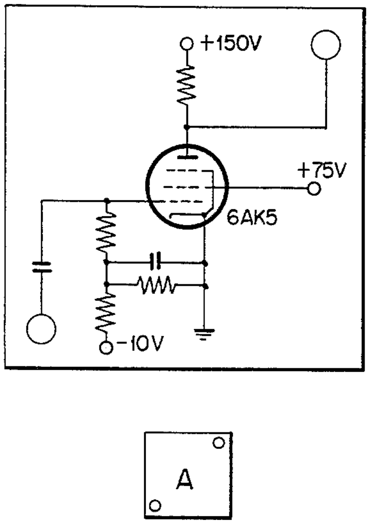
Fig. 4A is a detailed circuit diagram of the amplifiers represented by blocks 202p, 204p, 202s and 204s in the comparer circuit of Fig. 3.
Figure 4B:
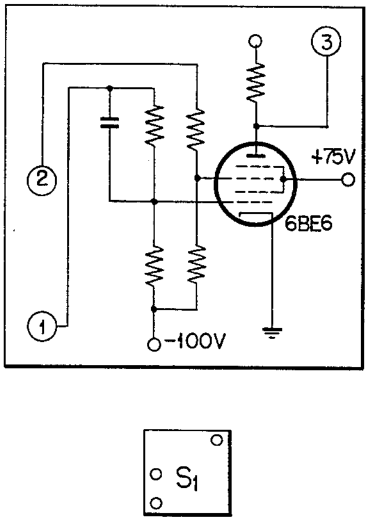
Fig. 4B is a detailed circuit diagram of the electronic switches represented by blocks 206p and 206s in the comparer circuit of Fig. 3.
Figure 4C:
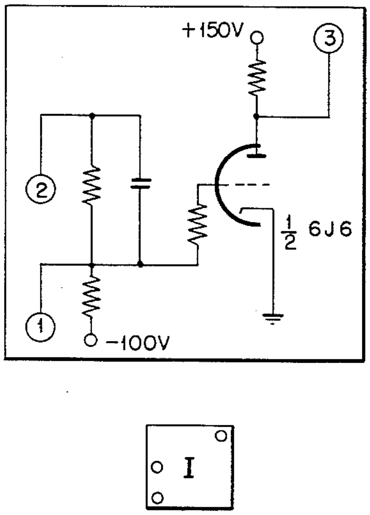
Fig. 4C is a detailed circuit diagram of the inverter switches represented by blocks 208p, 210p, 221p, 208s, 210s and 221s in the comparer circuit of Fig. 3.
Figure 4D:
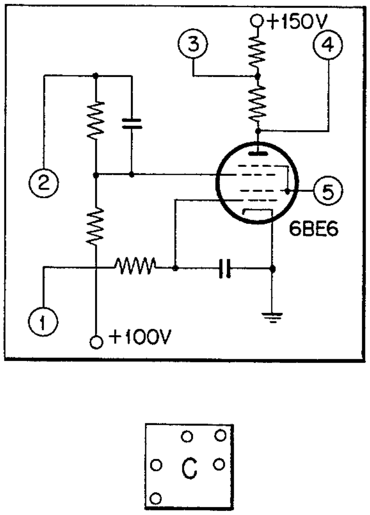
Fig. 4D is a detailed circuit diagram of the comparer switches represented by blocks 213p and 213s in the comparer circuit of Fig. 3.
Figure 4E:
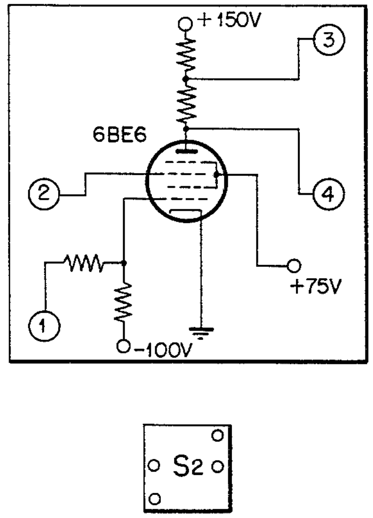
Fig. 4E is a detailed circuit diagram of the electronic switches represented by blocks 223p and 223s in the comparer circuit of Fig. 3.
Figure 4F:
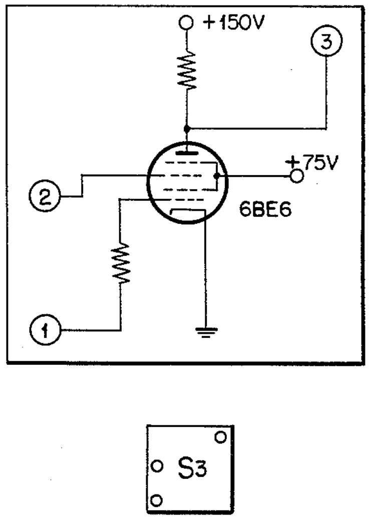
Fig. 4F is a detailed circuit diagram of the electronic switches represented by blocks 227p and 227s in the comparer circuit of Fig. 3.
Figure 4G:
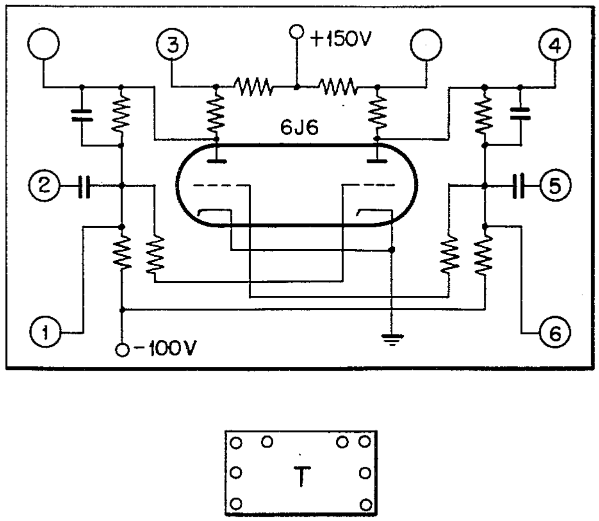
Fig. 4G is a detailed circuit diagram of the trigger circuits represented by blocks 216p, 225p, 216s and 225s in the comparer circuit of Fig. 3.

Now referring to Figs. 3 and 4D it will be seen that when positive voltage pulses are respectively impressed on terminals 1, 2 and 5 of comparer switch 213P, that said comparer switch will be rendered conductive and that negative pulses will appear at terminals 3 and 4 of said comparer switch. The negative pulse from terminal 3 of comparer switch 213P is impressed via lead 214P on terminal 2 of electronic trigger 216P. Triggers 216P and 216S are initially in their respective "off" positions, namely the right section as viewed in Figs. 3 and 4G, is conducting. When the negative voltage pulse from terminal 3 of comparer switch 213P is impressed on terminal 2 of trigger 216P, said trigger switches from its "off" to its "on" position, i.e. the left section as viewed in Figs. 3 and 4G, is conducting. When trigger 216P is in its "on" position, the potential at terminal 4 of said trigger is raised to approximately positive one hundred and fifty volts and via lead 217P is impressed on terminal 1 of thyratron switch 219P. However, thyratron switch 219P is not rendered conductive at this time since terminal 4 of said thyratron switch is connected through lead 303, resistor $R_5$ and lead 304 to a negative potential of approximately two hundred and fifty volts.

The negative pulse from terminal 4 of comparer switch 213P is impressed via lead 215P on terminal 2 of inverter switch 221P and results in a positive voltage pulse from terminal 3 of said inverter switch being impressed via lead 222P on terminal 1 of switch 223P. However, switch 223P is not rendered conductive since terminal 2 of said switch is connected via lead 305, resistor $R_7$ and lead 306 to a potential of approximately negative forty-five volts. Hence, it is seen that the application of positive pulse P20′ to primary pulse train input terminal 1C only results in trigger 216P being switched "on."

From the primary pulse train of Example No. 1, disclosed in Fig. 3B of the drawing, it can be seen that at approximately 131.5° machine time primary positive pulse P23′ occurs and is impressed on primary pulse train input terminal 1C. The application of pulse P23′ will also result in comparer switch 213P being energized, but the negative voltage pulse appearing at terminal 3 of said switch and impressed via lead 214P on terminal 2 of trigger 216P has no effect on the position of said trigger; trigger 216P remains in its "on" position.

Now referring to the secondary pulse train of Example No. 1, disclosed in Fig. 3B, it will be seen that at approximately 132° machine time secondary positive pulse S25′ is impressed on secondary pulse train input terminal 3C. The application of pulse S25′ results in comparer switch 213S being energized and a negative voltage pulse appearing at terminal 3 of said switch and being impressed via lead 214S on terminal 2 of trigger 216S. The impressing of this negative pulse on terminal 2 of trigger 216S results in said trigger switching from its "off" to its "on" position, i.e. left section as viewed in Figs. 3 and 4G, is conducting. The switching "on" of trigger 216S results in a positive voltage pulse from terminal 5 of said trigger being impressed via lead 218S on terminal 3 of trigger 216P and causing trigger 216P to switch to its "off" position. The negative pulse from terminal 4 of comparer switch 213S is impressed via lead 215S on terminal 2 of inverter switch 221S and results in a positive pulse from terminal 3 of said inverter switch being impressed via lead 222S on terminal 1 of switch 223S. Switch 223S is not rendered conductive, however, as its terminal 2 is connected through lead 305A, resistor $R_7$ and lead 306 to a negative forty-five volt potential.

In Fig. 3A the timing of the closing of output gate CC4 is shown. It will be noted that contacts CC4 close at approximately 132.5° machine time and remain closed for a short interval of time. In accordance with Example No. 1, as pointed out in detail supra, trigger 216S is in its "on" position when commutator contact CC4 closes at approximately 132.5° machine time. With trigger 216S in its "on" position the potential at terminal 4 of said trigger is approximately positive one hundred and fifty volts and this potential is impressed via lead 217S on terminal 1 of thyratron switch 219S. Now referring to the detailed circuit of thyratron switch 219S shown in Fig. 4H, and to Fig. 3 of the drawing, it will be seen that when commutator contact CC4 is closed a positive potential is respectively impressed on the shield grids of the thyratrons which are a part of thyratron switches 219P and 219S. The thyratron of thyratron switch 219S will be rendered conductive, because there is a positive potential of sufficient magnitude impressed on terminal 1 of said switch as a result of trigger 216S being in its "on" position; the thyratron of thyratron switch 219P will not be rendered conductive since trigger 216P is in its "off" position. When the thyratron of thyratron switch 219S is conducting then the current passing through relay coil R–2, which is in the plate circuit of said thyratron, is sufficient to energize said relay. When relay R–2 is energized the armature (not shown) of said relay is actuated and transfers the contacts (not shown) associated with said relay.

Figure 4H:
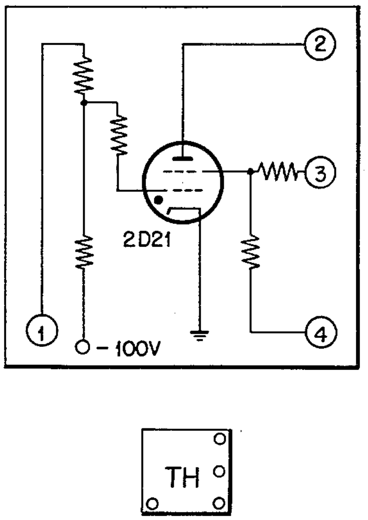
Fig. 4H is a detailed circuit diagram of the thyratron switches represented by blocks 219p and 219s in the comparer circuit of Fig. 3.

From an inspection of Figs. 3 and 4H of the drawing it will be seen that when the thyratron of thyratron switch 219S is conducting the potential at terminal 2 of said switch is approximately positive five to ten volts. This reduced potential from terminal 2 of thyratron switch 219S is impressed via lead 220S on terminal 3 of thyratron switch 219P. The impressing of this reduced potential on terminal 3 of thyratron switch 219P results through the medium of the circuitry interconnecting terminals 3 and 4 of thyratron switch 219P and the circuitry connected to terminal 4 of said thyratron switch, in reducing the potential on the shield grid of the thyratron included in thyratron switch 219P to such an extent that said thyratron switch cannot be rendered conductive during the remainder of the machine cycle associated with Example No. 1.

From the read-out timing chart of Fig. 3A it will be seen that at approximately 152.7° machine time reset gate CC5 closes for an interval of short duration. The closing of commutator contact CC5 results in a negative voltage pulse of approximately forty-five volts being impressed on terminal 4 of each of the triggers 216P and 216S, and on terminal 5 of each of the triggers 225P and 225S. The application of the negative 45 volt pulse to terminal 4 of trigger 216P, terminal 4 of trigger 216S, terminal 5 of trigger 225P, and terminal 5 of trigger 225S results in each of the foregoing triggers remaining in, or switching to, their respective "off" positions, i.e. the right hand section of each of said triggers as viewed in Figs. 3 and 4G will be conductive. This effectively places said triggers in their proper initial condition for the subsequent machine cycle.

As seen from the detailed explanation set forth above for Example No. 1, relay coil R–2 is energized at approximately 132.5° machine time. Now referring to the machine time chart disclosed in Fig. 2A it will be seen that at approximately 162° machine time, cam contact CB8 opens. The opening of cam contact CB8 removes the plate voltage from terminal 2 of thyratron switch 219S and thus renders said thyratron switch non-conductive. Now with both thyratron switches, 219P and 219S, non-conductive they are also in their proper initial condition for the subsequent machine cycle. Normally closed cam contact CB8, as seen in Fig. 2A, closes at approximately 170° machine time.

As will be recalled, under the conditions of Example No. 1, the primary record card had stored in its five columns which were under inspection the value 34967, and the secondary record card had stored in its corresponding five columns under inspection the value 35132. The "Right Entry High Indicator," namely relay coil R–2, was energized and transferred its contacts at approximately 132.5° machine time, indicating that the value stored in the secondary record card was of greater magnitude than the value stored in the primary record card. Relay coil R–2 remained energized and its contacts transferred till approximately 162° machine time.

From an inspection of the machine timing chart of Fig. 2A it will be seen that erase cam contacts CB6 and CB7 close at approximately 180° and open at approximately 220° machine time. The closing of cam contacts CB6 and CB7 connects primary read head RP1 and secondary read head RS1, respectively, to a conventional source of erase means (not shown) of either the direct current or alternating current type. Thus during erase time, namely machine time 180° through 220°, primary read head RP1 accomplishes the erasing of the information stored in primary magnetic track PT and secondary read head RS1 accomplishes the erasing of the information stored in secondary magnetic track ST. Primary magnetic track PT and secondary magnetic track ST are in this manner each placed in their proper initial condition for the subsequent machine cycle.

*Example No. 2*

For Example No. 2 let it be arbitrarily assumed that the five columns in deck B of primary record card 101P have stored in them the value 34967 and that the secondary record card 101S has stored in its five columns of deck B the value 34132. It will now be seen that as compared to Example No. 1 the value stored in primary record card 101P is the same in both examples. The value stored in secondary record card 101S has been decreased by 1,000 and, therefore, only the thousandth order of the value stored in secondary record card 101S is changed as compared to Example No. 1.

No detailed description of read-in time for Example No. 2 will be given since with obvious slight variation it will be identical to that of Example No. 1. The slight variation will be that secondary write head SW2 will record in the form of magnetic bits the digit 4 (as distinguished from the digit 5 in Example No. 1) in segment SC–2 of secondary magnetic track ST. That is, in segment SC–2 of secondary magnetic track ST a magnetic bit will be stored in cell "0" and in cell "3," respectively.

From Figs. 7 and 8 of the drawing, the physical displacement of magnetic bits stored in the primary magnetic track and the magnetic bits stored in the secondary magnetic track under the conditions of Example No. 2 will be seen. When the bits stored in the primary magnetic track are read out by primary read head RP1, a primary pulse train identical to that of Example No. 1 and shown in Fig. 3B will evolve. The secondary pulse train of Example No. 2 is also shown in Fig. 3B.

The comparing of the primary pulse train of Example No. 2 with the secondary pulse train of Example No. 2 as accomplished by the comparer circuit of Fig. 3 will now be explained. Primary pulse P13″ and secondary pulse S13″ both occur at the same machine time. Now from the explanation with regard to Example No. 1 it will be recalled that when a primary pulse and a secondary pulse occur at exactly the same machine time they have no effect on the comparer circuit of Fig. 3. It will also be apparent that since primary pulse P20″ and secondary pulse S20″ occur at the same time they have no effect on the comparer circuit of Fig. 3. Referring once more to Fig. 3B it will be seen that primary pulse P23″ and secondary pulse S23″ occur at exactly the same time and therefore have no effect on the comparer circuit of Fig. 3. It will now be seen from Fig. 3B that there is no secondary pulse corresponding in machine time to primary pulse P30″. Primary pulse P30″ results in comparer switch 213P being rendered conductive. As recalled from Example No. 1, when comparer switch 213P is rendered conductive a negative pulse from terminal 3 of said switch is impressed via lead 214P on terminal 2 of trigger 216P and results in said trigger switching from its "off" to its "on" position. From Fig. 3B it will be seen that secondary pulse S31″ of the secondary pulse train of Example No. 2 occurs at approximately 137° machine time and that there is no primary pulse corresponding in machine time to secondary pulse S31″. Secondary pulse S31″ results in comparer switch 213S being rendered conductive. When comparer switch 213S is rendered conductive a negative pulse from terminal 3 of said switch is impressed via lead 214S on terminal 2 of trigger 216S and results in said trigger switching from its "off" position to its "on" position. The switching "on" of trigger 216S results in a positive pulse from terminal 5 of trigger 216S being impressed via lead 218S on terminal 3 of trigger 216P. The positive pulse impressed on terminal 3 of trigger 216P results in said trigger switching from its "on" position to its "off" position. Thus the occurrence of secondary pulse S31″ of the secondary pulse train of Example No. 2 results in trigger 216S being switched "on" and trigger 216P being switched "off."

A short interval of machine time after the occurrence of secondary pulse S31″ primary pulse P33″ occurs. Primary pulse P33″ results in comparer switch 213P being rendered conductive. As a result of comparer switch 213P being rendered conductive a negative pulse from terminal 3 of said switch is impressed via lead 214P on terminal 2 of trigger 216P. The impressing of a negative pulse on terminal 2 of trigger 216P results in said trigger switching from its "off" position to its "on" position. When trigger 216P switches to its "on" position a positive pulse from terminal 5 of trigger 216P is impressed via lead 218P on terminal 3 of trigger 216S and results in trigger 216S switching to its "off" position. In summation, primary pulse P33″ results in trigger 216P being switched to its "on" position and trigger 216S being switched to its "off" position. At approximately machine time 138.5° primary pulse P35″ occurs. Primary pulse P35″ renders comparer switch 213P conductive and thereby results in a negative pulse from terminal 3 of said switch being impressed via lead 214P on terminal 2 of trigger 216P. However, trigger 216P is already in its "on" position and said trigger remains in its "on" position. When trigger 216P is in its "on" position the potential at terminal 4 of said trigger is of substantial magnitude and of positive polarity. This positive potential is impressed via lead 217P on terminal 1 of thyratron switch 219P. From the read-out timing chart of Fig. 3A it will be seen that output gate CC4 closes for a short interval of machine time at approximately 139° machine time. The closing of contact CC4 results in a positive potential being impressed on the shield grid of each of the thyratrons in thyratron switches 219P and 219S. Thyratron switch 219P will be rendered conductive and the "Right Entry Low Indicator," namely relay coil R–1, will be energized. Relay R–1 is energized and transfers its contacts (not shown) at approximately 139° machine time. This indicates that the value stored in secondary record card 101S is of lesser magnitude than the value stored in primary record card 101P.

From Figs. 3 and 4H of the drawing it will be seen that when thyratron switch 219P is conductive the potential at terminal 2 of said switch is reduced to approximately positive five to ten volts. The reduced potential from terminal 2 of thyratron switch 219P is impressed via lead 220P on terminal 3 of thyratron switch 219S. Impressing this reduced potential on terminal 3 of thyratron switch 219S results in reducing the potential on the shield grid of the thyratron included in thyratron switch 219S to such an extent that said thyratron switch cannot be rendered conductive during the remainder of the machine cycle associated with Example No. 2.

From the read-out timing chart of Fig. 3A it will be seen that at approximately 152.7° machine time reset gate CC5 closes for an interval of short duration. The closing of commutator contact CC5 results in a negative voltage pulse of approximately forty-five volts being impressed on terminal 4 of each of the triggers 216P and 216S, and on terminal 5 of each of the triggers 225P and 225S. The application of the negative voltage pulse results in each of the aforerecited triggers, namely 216P, 216S, 225P and 225S, switching to, or remaining in, its "off" position. The triggers are now in their proper initial condition for the subsequent machine cycle.

As seen from the machine timing chart of Fig. 2A read-out cam contacts CB2 and CB4 open at approximately 160° machine time.

From the detailed explanation set forth above with respect to Example No. 2 it is seen that relay coil R–1 is energized at approximately 139° machine time. Referring to the machine timing chart seen in Fig. 2A it will be seen that at approximately 162° machine time cam contact CB8 opens. The opening of cam contact CB8 removes the plate voltage from terminal 2 of thyratron switch 219P and thus renders said thyratron switch non-conductive. Now with both thyratron switches 219P and 219S non-conductive they are also in their proper initial condition for the subsequent machine cycle. Normally closed cam contacts CB8 as seen in Fig. 2A close at approximately 170° machine time.

As will be recalled, under the conditions of Example No. 2, the primary record card had stored in it the value 34967, and the secondary record card has stored in it the value 34132. The "Right Entry Low Indicator," namely relay coil R–1, was energized and transferred its contacts at approximately 139° machine time indicating that the value stored in the secondary record card was of lesser magnitude than the value stored in the primary record card. Relay coil R–1 remained energized and its contacts transferred for approximately 23° machine time, i.e, 139° to 162° machine time.

From an inspection of the machine timing chart of Fig. 2A it will be seen that erase cam contacts CB6 and CB7 close at approximately 180° machine time. The closing of cam contacts CB6 and CB7 connects primary read head RP1 and secondary read head RS1 to a conventional source of erase means (not shown). Cam contacts CB6 and CB7 open at approximately 220° machine time and thereby disconnect primary read head RP1 and secondary read head RS1 from the conventional source of erase means. Thus during erase time, namely machine time 180° through 220°, primary read head RP1 accomplishes the erasing of the information stored in primary magnetic track PT and secondary read head RS1 accomplishes the erasing of the information stored in secondary magnetic track ST.

*Example No. 3*

Example No. 3 will point out in detail how the novel comparing device disclosed herein recognizes that the alphabetic letters, word, or part thereof, stored in the primary record card is alphabetically of higher order (should appear first in an alphabetical file) than the alphabetic letters, word, or part thereof, stored in the secondary record card. Let it be arbitrarily assumed that stored in the five columns of deck B of the primary record card 101P are the alphabetic letters "HSJMT." Let it be arbitrarily assumed that stored in the five columns of deck B of the secondary record card 101S are the alphabetic letters "LKPQF."

It will be apparent that, in accordance with the code set forth in detail supra, the following punchings will appear in the five columns of deck B of primary record card 101P under observation: column 1 storing the alphabetic letter H has its "X," "0," "1" and "5" positions punched; column 2 storing the alphabetic letter S has its "Y," "3" and "5" positions punched; column 3 storing the alphabetic letter J has its "X," "0," "3" and "5" positions punched; column 4 storing the alphabetic letter M has its "Y," "0" and "1" positions punched; and column 5 having the alphabetic letter T stored therein has its "Y," "0," "3" and "5" positions punched. It will also be apparent that, in accordance with the code set forth in detail supra, the following punchings will appear in the five columns of deck B of secondary record card 101S under observation: column 1 storing the alphabetic letter L has its "Y" and "1" positions punched; column 2 storing the alphabetic letter K has its "Y" and "0" positions punched; column 3 storing the alphabetic letter P, has its "Y" and "5" positions punched; column 4 storing the alphabetic letter Q has its "Y," "0" and "5" positions punched; and column 5 storing the alphabetic letter F has its "X" and "5" positions punched.

No detailed description of read-in time for Example No 3 will be given since from the prior examples and disclosure it will be obvious how it is accomplished.

Figures 9, 10, 11, 12:
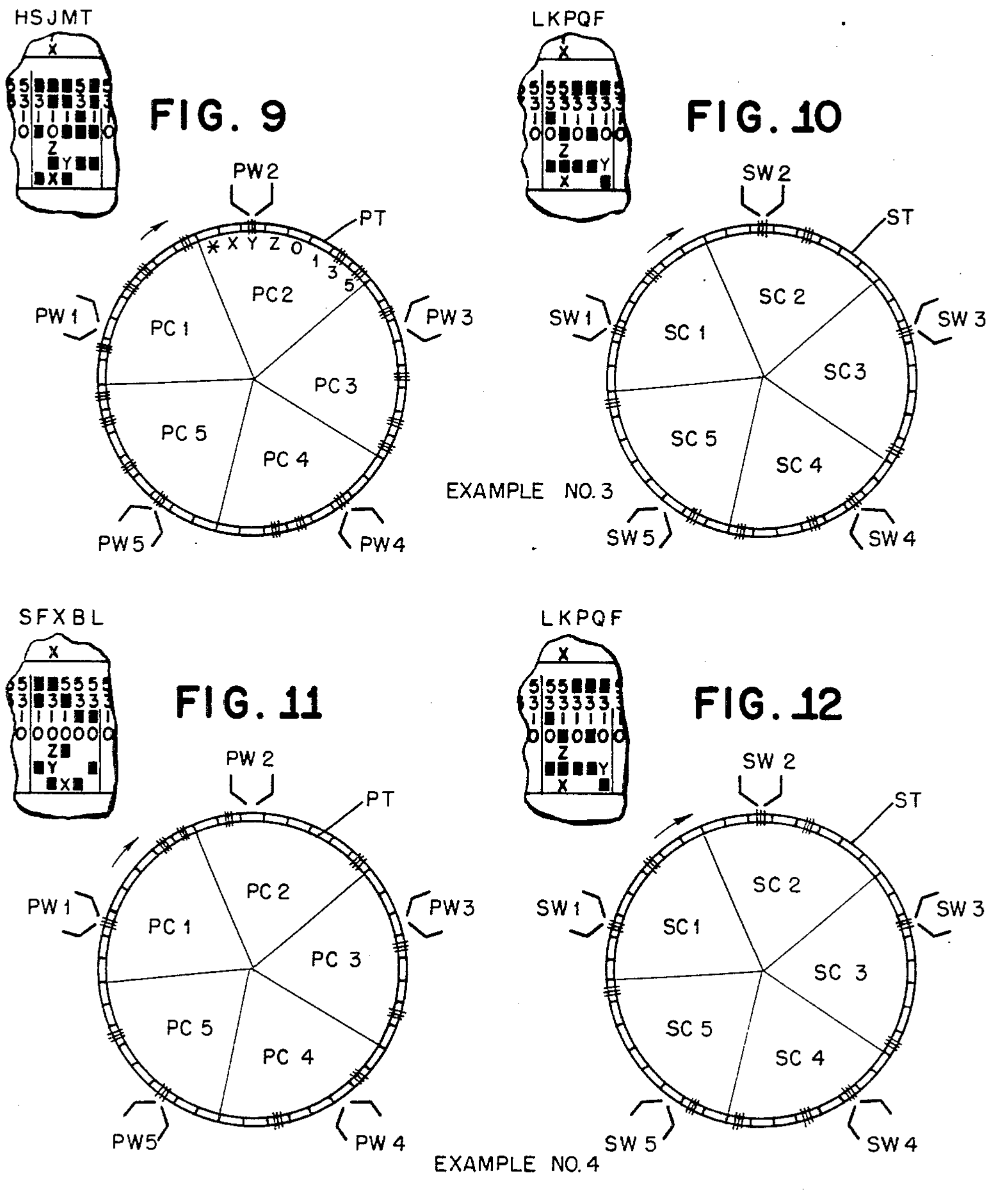
Fig. 9 is a simplified showing of primary magnetic track PT at (read-out time) approximately 120° machine time under the conditions of Example No. 3.
Fig. 10 is a simplified showing of secondary magnetic track ST at (read-out time) approximately 120° machine time under the conditions of Example No. 3.
Fig. 11 is a simplified showing of primary magnetic track PT at (read-out time) approximately 120° machine time under the conditions of Example No. 4.
Fig. 12 is a simplified showing of secondary magnetic track ST at (read-out time) approximately 120° machine time under the conditions of Example No. 4.

From Figs. 9 and 10 of the drawing, the magnetic bits stored in the primary track PT and the magnetic bits stored in the secondary magnetic track ST, under the arbitrarily assumed conditions of Example No. 3 will be seen. When the bits stored in the primary magnetic track PT are read out by primary read head RP1, a primary pulse train, as shown in Fig. 3B of the drawing, will evolve. When the bits stored in the secondary magnetic track ST are read out by secondary read head RS1, a secondary pulse train, as shown in Fig. 3B of the drawing, will evolve. As will be recalled, the primary pulse train is impressed on primary pulse train input terminal 1C of Fig. 3, and the secondary pulse train is impressed on secondary pulse train input terminal 3C of Fig. 3.

The comparing of the primary pulse train of Example No. 3 with the secondary pulse train of Example No. 3 as accomplished by the comparer circuit of Fig. 3 will now be explained. From an inspection of Fig. 3B it will be seen that primary pulse P11X′ occurs first in machine time, that there is no secondary pulse corresponding in time therewith, and that zone gate CC2 is closed at this point in machine time. The closing of zone gate CC2 (Fig. 3) results in terminal 2 of electronic switches 223P and 223S, respectively, being connected via lead 305, lead 305A, contact CC2 and lead 305B to ground. It will be noted that terminal 1 of switch 223P is connected via lead 222P to terminal 3 of inverter switch 221P, and that terminal 1 of switch 223S is connected via lead 222S to terminal 3 of inverter switch 221S. In order for either switch 223P or 223S to be conductive it must have impressed on its terminal 1 a positive pulse of sufficient magnitude, and its terminal 2 must be at ground potential, i.e. contacts CC2 closed. Triggers 225P and 225S are in their "off" position, i.e. right section as viewed in Figs. 3 and 4G conducting. When trigger 225P is in its "off" position, the potential at terminal 6 of said trigger is negative, and this negative potential is impressed via lead 226P on terminal 1 of switch 227P and keeps said switch from being conductive, regardless as to whether numerical gate contacts CC3 are open or closed. When switch 227P is non-conductive the potential at terminal 3 of said switch is approximately positive 150 volts. This positive potential from terminal 3 of switch 227P is impressed via lead 228P on terminal 2 of switch 206P. (Switch 206P is, therefore, in the same condition at the time primary pulse P11X′ of Example No. 3 is impressed on terminal 1C of the comparer circuit of Fig. 3 as it was initially under the conditions of Example No. 1 in spite of the fact that contacts CC2 are closed.) Therefore, primary pulse P11X′ will result in comparer switch 213P being rendered conductive in exactly the same manner as it was under the Examples 1 and 2. When comparer switch 213P is rendered conductive a negative voltage pulse from terminal 3 of said switch is impressed via lead 214P on terminal 2 of trigger 216P. The negative pulse impressed on terminal 2 of trigger 216P results in said trigger switching from its "off" position to its "on" position. Also, when comparer switch 213P is rendered conductive a negative pulse from terminal 4 of said switch is impressed via lead 215P on terminal 2 of inverter switch 221P, and this results in inverter switch 221P being rendered non-conductive and a positive pulse from terminal 3 of said inverter switch being impressed via lead 222P on terminal 1 of switch 223P. Since contacts CC2 are closed at this machine time, terminal 2 of switch 223P is at ground potential and the positive pulse impressed upon terminal 1 of said switch results in said switch being rendered conductive and a negative pulse from terminal 3 of said switch being transferred via lead 224P to terminal 2 of trigger 225P. The impressing of a negative pulse on terminal 2 of trigger 225P results in said trigger switching from its "off" position to its "on" position. When trigger 225P is in its "on" position, the potential at terminal 6 of said trigger is raised to a positive value and this positive potential is impressed via lead 226P on terminal 1 of switch 227P. In summation then, it may be said that primary pulse P11X′ of Example No. 3 results in triggers 216P and 225P being switched to their respective "on" positions.

Again referring to Fig. 3B it will be seen that at approximately machine time 121.5° secondary pulse S11Y′ occurs. At the machine time corresponding to secondary pulse S11Y′ there is no primary pulse, and zone gate CC2 is still closed. The impressing of secondary pulse S11Y′ on terminal 3C of the comparer circuit of Fig. 3 results in comparer switch 213S being rendered conductive. As a result of comparer switch 213S being rendered conductive a negative pulse from terminal 3 of said switch is impressed via lead 214S on terminal 2 of trigger 216S and results in said trigger being switched to its "on" position. The switching "on" of trigger 216S results in a positive pulse from terminal 5 of said trigger being impressed via lead 218S on terminal 3 of trigger 216P. The impressing of said positive pulse on terminal 3 of trigger 216P results in said trigger switching from its "on" position to its "off" position. Also, when comparer switch 213S is rendered conductive, a negative pulse from terminal 4 of said switch is impressed via lead 215S on terminal 2 of inverter switch 221S and results in a positive pulse from terminal 3 of said inverter switch being impressed vial lead 222S on terminal 1 of switch 223S. Since terminal 2 of switch 223S is at ground potential (i.e. contacts CC2 being closed at this time) the positive pulse on terminal 1 of said switch results in said switch being rendered conductive and a negative pulse from terminal 3 of said switch being impressed via lead 224S on terminal 2 of trigger 225S. The impressing of a negative pulse on terminal 2 of trigger 225S results in said trigger switching to its "on" position. When trigger 225S is in its "on" position a raised (positive) potential from terminal 6 of said trigger is impressed via lead 226S on terminal 1 of switch 227S. Briefly, after the occurrence of primary pulse P11X′ and secondary pulse S11Y′ of Example No. 3, trigger 216P is in its "off" position, trigger 225P is in its "on" position, trigger 216S is in its "on" position, and trigger 225S is in its "on" position.

From Fig. 3B it will be seen that primary pulse P110′ occurs at approximately 123° machine time. From Fig. 3A of the drawing it will be seen that at the point in machine time at which primary pulse P110′ occurs zone gate CC2 is open and numeric gate CC3 is closed. From Fig. 3 it will be seen that when contacts CC3 are closed, that terminal 2 of switch 227P and terminal 2 of switch 227S are connected via lead 350, lead 350A, closed contacts CC3, and lead 350B to ground. Triggers 225P and 225S are respectively in their "on" position. This results in a positive potential from terminal 6 of trigger 225P being impressed via lead 226P on terminal 1 of switch 227P, and in a positive potential from terminal 6 of trigger 225S being impressed via lead 226S on terminal 1 of switch 227S. Switches 227P and 227S are thereby rendered conductive, since, each now has a positive potential impressed on its terminal 1 and its terminal 2 is effectively connected to ground. When switches 227P and 227S are conductive it will be seen from Figs. 3 and 4F of the drawing that the potential at terminal 3 of each of said switches is reduced to a magnitude of a few volts positive with respect to ground. The reduced potential from terminal 3 of switch 227P is impressed via lead 228P on terminal 2 of switch 206P and precludes switch 206P from being rendered conductive. The reduced potential from terminal 3 of switch 227S is impressed via lead 228S on terminal 2 of switch 206S and precludes switch 206S from being rendered conductive.

To briefly summarize: when trigger 225P is in its "on" position and the numeric gate (commutator contacts CC3) is closed then switch 227P is conductive and switch 206P is thereby precluded from being rendered conductive; when trigger 225S is in its "on" position and the numeric gate (commutator contact CC3) is closed then switch 227S is conductive and switch 206S is thereby precluded from being rendered conductive. At the machine time at which primary pulse P110′ occurs, switch 206P is precluded from being rendered conductive; hence, primary pulse P110′ has no effect on the status of the triggers of the comparer circuit of Fig. 3.

Primary pulse P111′ and secondary pulse S111′ both occur at the same machine time, which is approximately 124° machine time. However, since both switches 206P and 206S are at this point in machine time precluded from being rendered conductive, neither primary pulse P111′ nor secondary pulse S111′ have any effect on the status of the triggers of the comparer circuit of Fig. 3.

Primary pulse P115′ occurs at approximately 125.5° machine time but since at this point in machine time switch 206P is precluded from being rendered conductive, said pulse has no effect on the status of the triggers of the comparer circuit of Fig. 3.

From Fig. 3A it will be seen that at approximately 126° machine time the output gate CC4 closes for a short interval of time. The closing of commutator contacts CC4 results in the thyratron of thyratron switch 219S being conductive. When thyratron switch 219S is conductive, then relay R–2, i.e., "Right Entry High Indicator," is energized and transfers its contacts. Thus relay coil R–2 is energized at approximately 126° machine time and will remain energized until approximately 162° machine time.

Hence, it is seen that the comparer circuit of Fig. 3 distinguished between the primary pulse train of Example No. 3 (which reflected that the alphabetical letters "HSJMT" are stored in primary record card 101P) and the secondary pulse train of Example No. 3 (which reflected that the alphabetical letters "LKPQF" are stored in secondary record card 101S) by the energization of relay R–2 for the interval in machine time consisting of 36°, i.e., 126 through 162.

The resetting of triggers 216P, 225P, 216S and 225S is accomplished in the same manner as described in detail with respect to Examples 1 and 2.

The erasing of the information stored in the primary magnetic track PT and the secondary magnetic track ST is accomplished in the same manner as set forth in detail with respect to Examples 1 and 2.

*Example No. 4*

Example No. 4 will point out in detail how the novel comparing device disclosed herein recognizes that the alphabetical letters stored in the primary record card 101P are alphabetically of lower order (should appear second in an alphabetical file) than the alphabetical letters stored in the secondary record card 101S. Let it be arbitrarily assumed that stored in the five columns of deck B of the primary record card 101P are the alphabetical letters "SFXBL.". Let it be arbitrarily assumed that stored in the five columns of deck B of the secondary record card 101S are the alphabetical letters "LKPQF."

It will be apparent that in accordance with the code set forth in detail supra the following punchings will appear in the five columns of deck B of primary record card 101P under observation: column 1 storing the alphabetic letter S has its "Y," "3" and "5" positions punched; column 2 storing the alphabetic letter F has its "X" and "5" positions punched; column 3 storing the alphabetic letter X has its "Z" and "3" positions punched; column 4 storing the alphabetic letter B has its "X" and "1" positions punched; and column 5 storing the alphabetic letter L has its "Y" and "1" positions punched. It will also be apparent that in accordance with the code set forth in detail supra, the following punchings will appear in the five columns of deck B of secondary record card 101S under observation: column 1 storing the alphabetic letter L has its "Y" and "1" positions punched; column 2 storing the alphabetic letter K has its "Y" and "0" positions punched; column 3 storing the alphabetic letter P has its "Y" and "5" positions punched; column 4 storing the alphabetic letter Q has its "Y," "0" and "5" positions punched; and column 5 storing the alphabetic letter F has its "X" and "5" positions punched.

No detailed description of read-in time for Example No. 4 will be given since from the detailed description of Examples 1 and 2 it will be obvious how it is accomplished.

From Figs. 11 and 12 of the drawing, the magnetic bits stored in the primary magnetic track PT and the magnetic bits stored in the secondary magnetic track ST under the arbitrarily assumed conditions of Example No. 4 will be seen. When the bits stored in the primary magnetic track are read out by primary read head RP1, a primary pulse train, generally as shown in Fig. 3B will result. When the bits stored in the secondary magnetic track are read out by secondary read head RS1, a secondary pulse train, generally as shown in Fig. 3B will result.

The comparing of the primary pulse train of Example No. 4 with the secondary pulse train of Example No. 4 as accomplished by the comparer circuit of Fig. 3 will now be explained. From an inspection of Fig. 3B it will be seen that primary pulse P11Y″ and secondary pulse S11Y″ occur at the same machine time, i.e., approximately 121.5° machine time. It will be recalled from the earlier examples that when a primary pulse and a secondary pulse occur at the same machine time that the position of the triggers of the comparer circuit of Fig. 3 is not affected. Now referring to Fig. 3B it will be seen that the secondary pulse S111″ occurs at approximately 124° machine time. The occurrence of secondary pulse S111″ results in trigger 216S switching from its "off" position to its "on" position. Still referring to Fig. 3B it will be seen that primary pulse P113″ occurs at approximately 125° machine time. Primary pulse P113″ results in trigger 216P switching from its "off" position to its "on" position. The switching "on" of trigger 216P results in trigger 216S switching "off." Therefore, at the time at which primary pulse P115″ occurs, namely, approximately machine time 125.5°, trigger 216P is already in its "on" position and primary pulse P115″ does not affect the position of said trigger.

Now from Fig. 3A it will be seen that at approximately 126° machine time output gate CC4 closes. Since trigger 216P is in its "on" position, the closing of output gate CC4 results in thyratron switch 219P being rendered conductive. When thyratron switch 219P is rendered conductive relay coil R–1, i.e., Right Entry Low Indicator is energized and transfers its contacts. The energization of relay R–1 indicates that the information stored in primary record card 101P is alphabetically of lower order than the information stored in secondary record card 101S. Relay R–1 remains energized until reset cam contact CB8 opens at approximately 162° machine time.

Hence, it will be seen that the comparer circuit of Fig.

3 distinguished between the primary pulse train of Example No. 4 (which reflected that the alphabetical letters "SFXBL" are stored in primary record card 101P) and the secondary pulse train of Example No. 4 (which reflected that the alphabetical letters "LKPQF" are stored in secondary record card 101S) by the energization of relay R–1.

The resetting of the triggers of the comparer circuit of Fig. 3 is accomplished in the same manner as set forth in detail with regard to the preceding examples.

The erasing of the information stored in the primary magnetic track PT and the secondary magnetic track ST is accomplished in the same manner as earlier set forth.

*Example No. 5*

Example No. 5 will also point out in detail how the novel comparing device disclosed herein recognizes that the word or part thereof stored in primary record card 101P is alphabetically of higher order (i.e., should appear first in an alphabetical file) than the word or part thereof stored in the secondary record card 101S. Let it be arbitrarily assumed that stored in the five columns of deck B of primary record card 101P is the word "Steel." Let it be arbitrarily assumed that stored in the five columns of deck B of the secondary record card 101S is the word "Stone." It will be apparent that in accordance with the code set forth in detail supra, the following punchings will appear in the five columns of deck B of primary record card 101P under observation: column 1 storing the alphabetic letters S has its "Y," "3" and "5" positions punched; column 2 storing the alphabetic letter T has its "Y," "O," "3" and "5" positions punched; column 3 storing the alphabetic letter E has its "X," "O" and "3" positions punched; column 4 storing the alphabetic letter E has its "X," "0" and "3" positions punched; and column 5 storing the alphabetic letter L has its "Y" and "1" positions punched. It will also be apparent that in accordance with the code set forth in detail supra, the following punchings will appear in the five columns of deck B of secondary record card 101S under observation: column 1 storing the alphabetic letter S has its "Y," "3" and "5" positions punched; column 2 storing the alphabetic letter T has its "Y," "0," "3" and "5" positions punched; column 3 storing the alphabetic letter O has its "Y," "0" and "3" positions punched; column 4 storing the alphabetic letter N has its "Y" and "3" positions punched; and column 5 storing the alphabetic letter E has its "X," "0" and "3" positions punched.

No detailed description of read-in time for Example No. 5 will be given.

Figure 13:
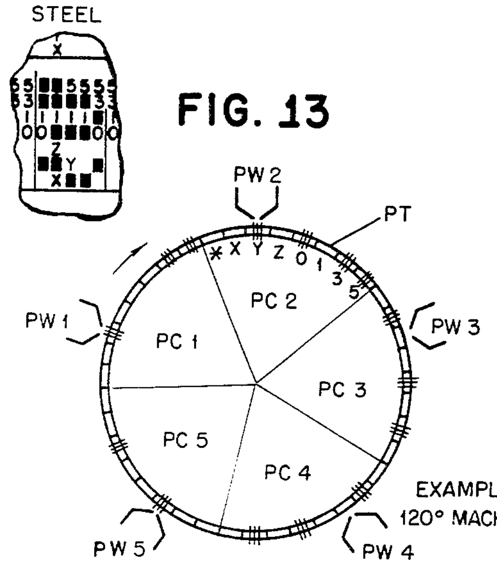
Fig. 13 is a simplified showing of primary magnetic track PT at (read-out time) approximately 120° machine time under the conditions of Example No. 5.
Figure 14:
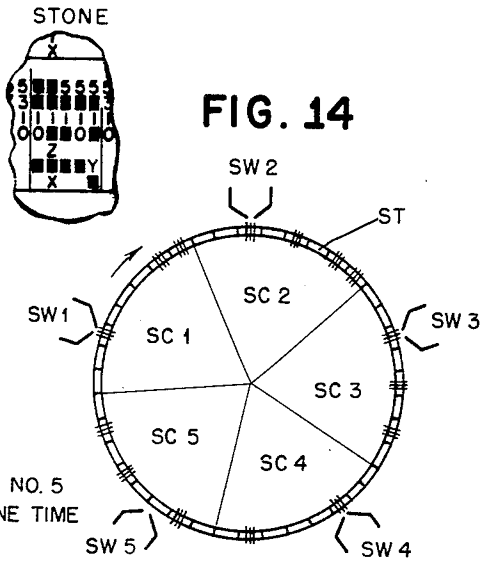
Fig. 14 is a simplified showing of secondary magnetic track ST at (read-out time) approximately 120° machine time under the conditions of Example No. 5.

From Figs. 13 and 14 of the drawing, the magnetic bits stored in primary magnetic track PT and the magnetic bits stored in secondary magnetic track ST, under the arbitrarily assumed conditions of Example No. 5, will be seen. When the bits stored in the primary magnetic track are read out by primary read head RP1, a primary pulse train generally as shown in Fig. 3B will result. When the bits stored in the secondary magnetic track are read out by secondary read head RS1, a secondary pulse train generally as shown in Fig. 3B will result.

The comparing of the primary pulse train of Example No. 5 with the secondary pulse train of Example No. 5 as accomplished by the comparer circuit of Fig. 3 will now be explained. From an inspection of Fig. 3B, it will be seen that primary pulse P21Y and secondary pulse S21Y occur at the same machine time, namely, approximately 121.5° machine time. Primary pulse P213 and secondary pulse S213 occur at the same machine time, namely, approximately 124.8° machine time. Primary pulse P215 and secondary pulse S215 occur at the same machine time, namely, approximately 125.5° machine time. It will be recalled from an earlier discussion herein that when a primary pulse and a secondary pulse occur at the same machine time they have no effect on the position of any of the triggers of the comparer circuit of Fig. 3. Therefore, when output gate CC4 closes at approximately 126° machine time, since both triggers 219P and 219S are respectively in their "off" position, neither thyratron switch 219P nor thyratron switch 219S will be rendered conductive. At approximately 126.5° reset gate CC5 closes and would result in switching any trigger that was in its "on" position to its "off" position, however, all triggers are prior to the closing of contact CC5 already in their "off" position.

Again referring to Fig. 3B it will be seen that primary pulse P22Y and secondary pulse S22Y occur at the same machine time, namely, approximately 128° machine time. Primary pulse P220 and secondary pulse S220 occur at the same machine time, namely, approximately 129.5° machine time. At approximately 131° machine time primary pulse P223 and secondary pulse S223 occur. Primary pulse P225 and secondary pulse S225 occur at the same machine time, approximately 132° machine time. Triggers 216P, 225P, 216S and 225S of Fig. 3 are all still in their respective "off" positions. Output gate CC4 closes at approximately 132.5° machine time, but neither thyratron switch 219P nor thyratron switch 219S is rendered conductive. Reset gate CC5 closes at approximately 133° machine time but has no effect since all four triggers of Fig. 3 are in their "off" position.

Still referring to Fig. 3B it will be seen that at approximately 133.5° machine time, primary pulse P23X occurs. It will also be noted that at the time primary pulse P23X occurs, there is no secondary pulse corresponding in time therewith, and that zone gate CC2 is closed. In view of the immediately afore-recited conditions that exist at the time at which primary pulse P23X occurs, said primary pulse results in triggers 216P and 225P of Fig. 3 each switching from its "off" position to its "on" position. Secondary pulse S23Y occurs at approximately 132.3° machine time and has no primary pulse corresponding in machine time with it. Zone gate CC2 is still closed when secondary pulse S23Y occurs. Therefore, secondary pulse S23Y results in triggers 216S and 225S switching from their respective "off" positions to their respective "on" positions. Further, the switching "on" of trigger 216S results in the switching "off" of trigger 216P. Primary pulse P230 and secondary pulse S230 both occur at the same machine time, namely, approximately 136° machine time. Primary pulse P233 and secondary pulse S233 both occur at the same machine time, namely, approximately 137.5° machine time. As was pointed out earlier, when a primary pulse and a secondary pulse occur at the same machine time, they have no effect on the position of any of the triggers of the comparer circuit of Fig. 3. (However, it should also be noted, that switch 206P is precluded from being rendered conductive, while numeric gate CC3 is closed and trigger 225P is in its "on" position: and that switch 206S is precluded from being rendered conductive while numeric gate CC3 is closed and trigger 225S is in its "on" position. This was explained in detail with regard to an earlier example.) Thus, at approximately 139° machine time when output gate CC4 closes, since trigger 216S is in its "on" position, thyratron switch 219S is rendered conductive. When thyratron switch 219S is rendered conductive, then relay coil R–2, namely, the Right Entry High Indicator, is energized and transfers its contacts. Relay R–2 will remain energized until approximately 162° machine time when reset cam contact CB8 opens.

Hence, it is seen that the comparer circuit of Fig. 3 distinguishes between the primary pulse train of Example No. 5 (which reflected that the word "Steel" is stored in primary card 101P) and the secondary pulse train of Example No. 5 (which reflected that the word "Stone" is stored in record card 101S) by the energization of relay R–2 for an interval in machine time consisting of approximately 23°.

The resetting of triggers 216P, 225P, 216S and 225S is accomplished in the manner set out in detail earlier herein.

The erasing of the information stored in the primary magnetic track PT and the secondary magnetic track ST is accomplished in the manner set out in detail earlier herein.

*Example No. 6*

Example No. 6 will point out in detail how the novel comparing device disclosed herein recognizes that the word or part thereof stored in primary record card 101P is alphabetically of lower order (should appear later in an alphabetical file) than the word or part thereof stored in the secondary record card 101S. Let it be arbitrarily assumed that stored in the five columns of deck B of primary record card 101P is the word "Towne." Let it be arbitrarily assumed that stored in the five columns of deck B of the secondary record card 101S is the word "Stone." It will be apparent that in accordance with the code set forth in detail supra the following punchings will appear in the five columns of deck B of primary record card 101P under observation; column 1 storing the alphabetic letter T has its "Y," "0," "3" and "5" positions punched; column 2 storing the alphabetic letter O has its "Y," "0" and "3" positions punched; column 3 storing the alphabetic letter W has its "Z," "0" and "1" positions punched; column 4 storing the alphabetic letter N has its "Y" and "3" positions punched; column 5 storing the alphabetic letter E has its "X," "0" and "3" positions punched. It will be apparent that in accordance with the code set forth in detail supra the following punchings will appear in the five columns of deck B of secondary record card 101S under observation: column 1 storing the alphabetic letter S has its "Y," "3" and "5" positions punched; column 2 storing the alphabetic letter T has its "Y," "0," "3" and "5" positions punched; column 3 storing the alphabetic letter O, has its "Y," "0" and "3" positions punched; column 4 storing the alphabetic letter N has its "Y" and "3" positions punched; and column 5 storing the alphabetic letter E has its "X," "0" and "3" positions punched.

No detailed description of read-in time for Example No. 6 will be given.

Figure 15:
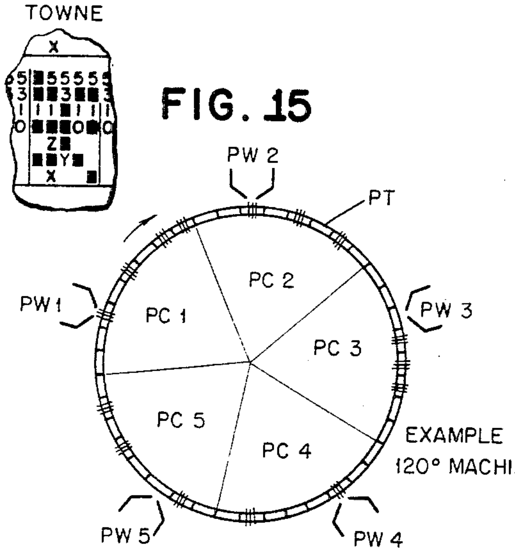
Fig. 15 is a simplified showing of primary magnetic track PT at (read-out time) approximately 120° machine time under the conditions of Example No. 6.
Figure 16:
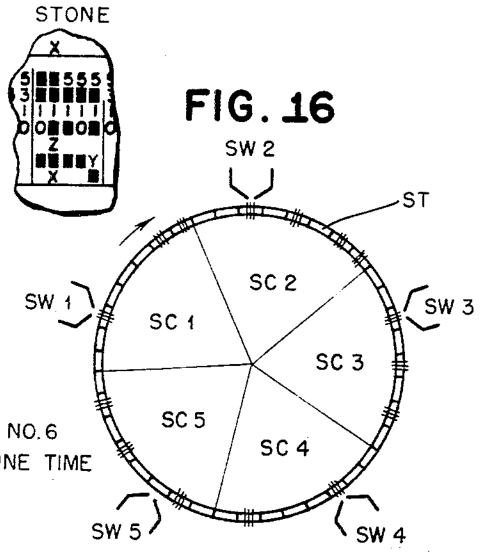
Fig. 16 is a simplified showing of secondary magnetic track ST at (read-out time) approximately 120° machine time under the conditions of Example No. 6.

From Figs. 15 and 16 of the drawing, the magnetic bits stored in primary magnetic track PT and the magnetic bits stored in secondary magnetic track ST under the arbitrarily assumed conditions of Example No. 6 will be seen. When the bits stored in the primary magnetic track are read out by primary read head RP1, a primary pulse train generally as shown in Fig. 3B will result. When the bits stored in the secondary magnetic track are read out by secondary read head RS1 a secondary pulse train generally as shown in Fig. 3B will result.

The comparing of the primary pulse train of Example No. 6 with the secondary pulse train of Example No. 6 as accomplished by the comparer circuit of Fig. 3 will now be explained. From an inspection of Fig. 3B it will be seen that primary pulse P21Y′ and secondary pulse S21Y′ occur at the same machine time, which is approximately 121.5° machine time. As will be recalled, when a primary pulse and a secondary pulse occur at the same machine time, they have no effect upon the position of any of the triggers of the comparer circuit of Fig. 3. At approximately 123° machine time, primary pulse P210′ occurs and there is no secondary pulse corresponding in time to this primary pulse. Therefore, primary pulse P210′ results in trigger 216P switching to its "on" position. At approximately 124.5° machine time, primary pulse P213′ and secondary pulse S213′ occur, but have no effect on the position of any of the triggers of the comparer circuit of Fig. 3. Primary pulse P215′ and secondary pulse S215′ occur at the same machine time, i.e., approximately 125.5° machine time, but they have no effect on the position of any of the triggers of the comparer circuit of Fig. 3. Hence, at approximately 126° machine time when output gate CC4 closes only trigger 216P is in its "on" position. The closing of output gate CC4, trigger 216P being in its "on" position, results in thyratron switch 219P being rendered conductive. When thyratron switch 219P is rendered conductive at approximately 126° machine time, relay R–1, i.e., Right Entry Low Indicator, is energized. Relay R–1 will remain energized until approximately 162° machine time at which time reset cam contact CB8 opens.

Hence, it is seen that the comparer circuit of Fig. 3 distinguished between the primary pulse train of Example No. 6 which reflected that the word "Towne" is stored in primary record card 101P and the secondary pulse train of Example No. 6 which reflected that the word "Stone" is stored in secondary record card 101S by the energization of relay R–1 for the interval in machine time consisting of approximately 36 degrees, i.e., approximately 126° machine time to 162° machine time.

The resetting of triggers 216P, 225P, 216S and 225S is accomplished in the manner set out in detail earlier herein.

The erasing of the information stored in the primary magnetic track PT and the secondary magnetic track ST is accomplished in the manner set out in detail earlier herein.

*Example No. 7*

Example No. 7 will point out in detail how the novel comparing device disclosed herein recognizes that the word or part thereof punched in primary record card 101P is alphabetically of lower order (should appear after later in an alphabetical file) than the word or part thereof punched in the secondary record card 101S. Let it be arbitrarily assumed that stored in the five columns of deck B if primary record card 101P is the word "Alban." Let it be arbitrarily assumed that stored in the five columns of deck B of the secondary record card 101S is the word "Akron." It will be apparent that in accordance with the code set forth in detail supra the following punchings will appear in the five columns of deck B of primary record card 101P under observation: column 1 storing the alphabetic letter A has its "X" and "0" positions punched; column 2 storing the alphabetic letter L has its "Y" and "1" positions punched; column 3 storing the alphabetic letter B has its "X" and "1" positions punched; column 4 storing the alphabetic letter A has its "X" and "0" positions punched; and column 5 storing the alphabetic letter N has its "Y" and "3" positions punched. It will also be apparent that in accordance with the code set forth in detail supra the following punchings will appear in the five columns of deck B of secondary record card 101S under observation: column 1 storing the alphabetic letter A has its "X" and "0" positions punched; column 2 storing the alphabetic letter K has its "Y" and "0" positions punched; column 3 storing the alphabetic letter R has its "Y," "0," "1," and "5" positions punched; column 4 storing the alphabetic letter O has its "Y," "0" and "3" positions punched; and column 5 storing the alphabetic letter N has its "Y" and "3" positions punched.

No detailed description of read in time for Example No. 7 is given.

Figures 17, 18, 19, 20:
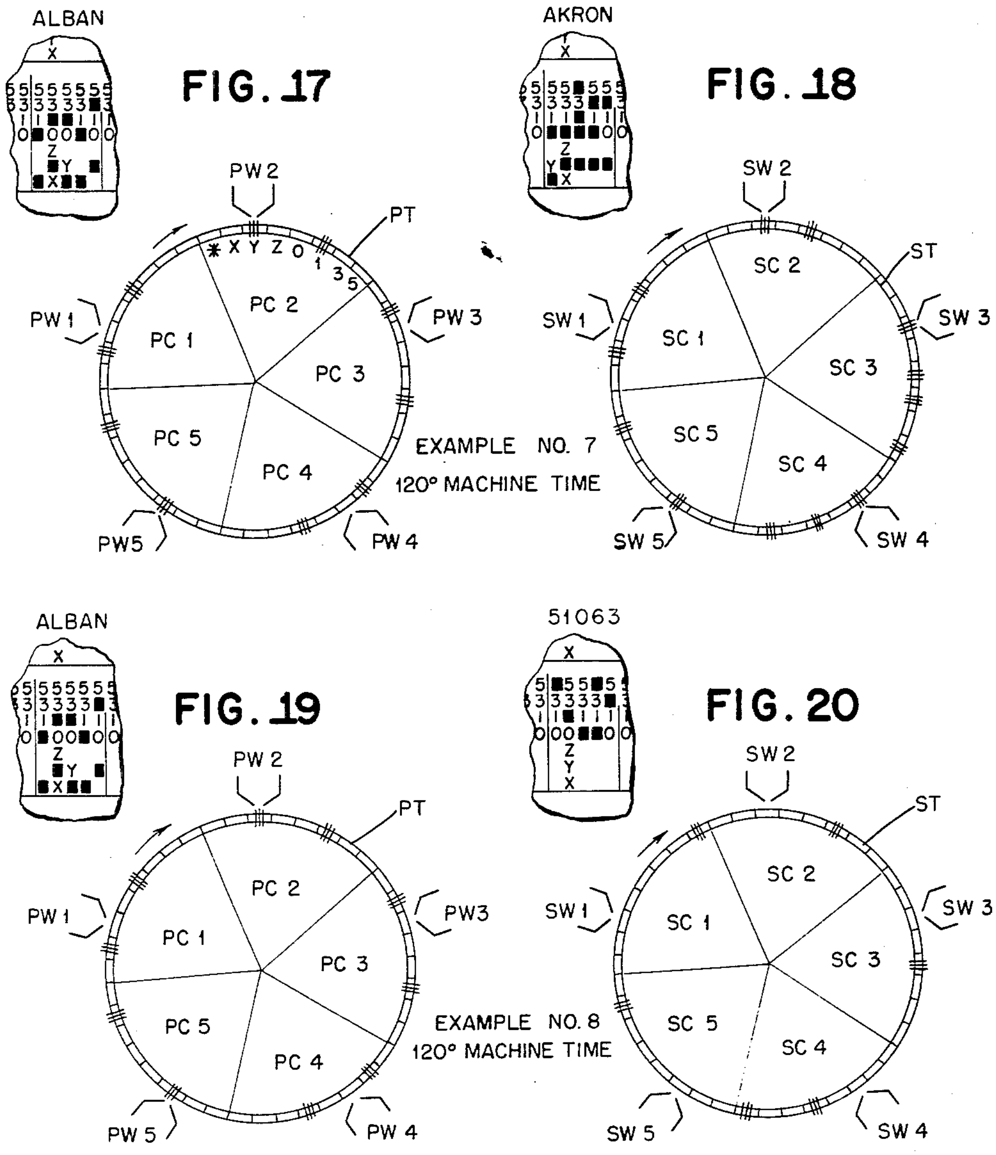
Fig. 17 is a simplified showing of primary magnetic track PT at (read-out time) approximately 120° machine time under the conditions of Example No. 7.
Fig. 18 is a simplified showing of secondary magnetic track ST at (read-out time) approximately 120° machine time under the conditions of Example No. 7.
Fig. 19 is a simplified showing of primary magnetic track PT at (read-out time) approximately 120° machine time under the conditions of Example No. 8.
Fig. 20 is a simplified showing of secondary magnetic track ST at (read-out time) approximately 120° machine time under the conditions of Example No. 8.

From Figures 17 and 18 of the drawing the magnetic bits stored in primary magnetic track PT and the magnetic bits stored in secondary magnetic track ST under the arbitrarily assumed conditions of Example No. 7 will be seen. When the bits stored in primary magnetic track PT are read out by primary read head RP1, a primary pulse train generally as shown in Figure 3B will result. When the bits stored in the secondary magnetic track ST are read out by secondary read head RS1, a secondary pulse train generally as shown in Figure 3B will result.

The comparing of the primary pulse train of Example

No. 7 with the secondary pulse train of Example No. 7 as accomplished by the comparer circuit of Figure 3 will now be explained. From an inspection of Figure 3B it will be seen that primary pulse P21X″ and secondary pulse S21X″ occur at the same machine time and thus have no effect on the position of any of the triggers of the comparer circuit of Figure 3. Primary pulse P210″ and secondary pulse S210″ both occur at approximately 123° machine time and thus have no effect on the position of any of the triggers of the comparer circuit of Figure 3. Therefore, when output gate CC4 closes at approximately 126° machine time neither thyratron switch 219P nor thyratron switch 219S will be rendered conductive. At approximately 126.5° machine time, reset gate CC5 closes and insures that triggers 216P, 225P, 216S and 225S are respectively in their "off" positions. At approximately 128° machine time primary pulse P22Y″ and secondary pulse S22Y″ occur, but have no effect on the position of any of the triggers of the comparer circuit. At approximately 129.5° machine time secondary pulse S220″ occurs and results in trigger 216S switching to its "on" position. At approximately 130.3° machine time primary pulse P221″ occurs and results in trigger 216P switching to its "on" position. The switching "on" of trigger 216P results in trigger 216S switching to its "off" position. Now, with trigger 216P in its "on" position, the closing of output gate CC4 at approximately 132.4° machine time, results in thyratron switch 219P being rendered conductive. When thyratron switch 219P is rendered conductive, relay R–1, i.e., Right Entry Low Indicator is energized and transfers its contacts. Relay R–1 will remain energized until approximately 162° machine time when reset cam contact CB8 opens.

Hence, it is seen that the comparer circuit of Figure 3 distinguished between the primary pulse train of Example No. 7 which reflects that the word "Alban" is stored in primary record card 101P and the secondary pulse train of Example No. 7 which reflects that the word "Akron" is stored in record card 101S by the energization of relay R–1 for the interval in machine time consisting of approximately 29.6°, i.e., approximately 132.4° machine time to 162° machine time.

The subsequent resetting of triggers 216P, 225P, 216S and 225S and the erasing of the information stored in the primary magnetic track PT and the secondary magnetic track ST are accomplished in the manner previously set out in detail.

*Example No. 8*

Example No. 8 will point out in detail how the novel comparing device disclosed herein recognizes that a word or part thereof is punched in primary record card 101P while a number (series of numerical digits, at least) is punched in secondary record card 101S. Let it be arbitrarily assumed that stored in the five columns of deck B of primary record card 101P is the word "Alban." Let it be arbitrarily assumed that stored in the five columns of deck B of the secondary record card 101S is the number "51063." It will be apparent that in accordance with the code set forth in detail supra the following punchings will appear in the five columns of deck B of primary record card 101P under observation: column 1 storing the alphabetic letter A has its "X" and "0" positions punched; column 2 storing the alphabetic letter L has its "Y"and "1" positions punched; column 3 storing the alphabetic letter B has its "X" and "1" positions punched; column 4 storing the alphabetic letter A has its "X" and "0" positions punched; and column 5 storing the alphabetic letter N has its "Y" and "3" positions punched. It will also be apparent that in accordance with the code set forth in detail supra the following punchings will appear in the five columns of deck B of secondary record card 101S under observation: column 1 storing the numerical digit five has its "5" position punched; column 2 storing the numerical digit one has its "1" position punched; column 3 storing the numerical digit zero has its "0" position punched; column 4 storing the numerical digit six has its "0" and "5" positions punched; and column 5 storing the numerical digit three has its "3" position punched.

It is to be noted that numerical digits, zero, and one through nine, in accordance with the code set out earlier herein, never have a zone position punched; the zone positions, as stated earlier, being the "X," "Y" and "Z" positions. Whereas also in accordance with the code set out earlier herein, alphabetic letters A through Z each include one of the zone positions being punched.

Prior to a detailed description of how the comparer circuit of Fig. 3 distinguishes between a numeric value stored in primary record card 101P and a word, or alphabetic letters, stored in secondary record card 101S (or vice-versa) is will be necessary to point out certain additional circuitry which is only utilized when the above-recited conditions are encountered. The additional circuitry is shown in Fig. 3 of the drawings and consists of the following: lead 360P, switch $S_{AN}$, and lead 360S. It will be seen that lead 360P connects terminal 4 of electronic switch 223P to one side of switch $S_{AN}$, and that lead 360S connects terminal 4 of electronic switch 223S to the other side of switch $S_{AN}$. Switch $S_{AN}$ is only closed when it is desired to distinguish between a numeric value stored in primary record card 101P and alphabetic letters, or a word, stored in secondary record card 101S, or vice-versa. From Fig. 3 it will be seen that with switch $S_{AN}$ closed (as it must be for Example No. 8 to be accomplished) terminal 4 of switch 223P is effectively connected to terminal 4 of switch 223S. Switch $S_{AN}$ is shown as a manually operated single-pole, single-throw switch. However, it is to be appreciated that switch $S_{AN}$ could take the form of a card-controlled electronic switch.

No detailed description of read-in time for Example No. 8 will be given.

From Figs. 19 and 20 of the drawing, the magnetic bits stored in the primary magnetic track PT and the magnetic bits stored in the secondary magnetic track ST under the arbitrarily assumed conditions of Example No. 8 will be seen. When the bits stored in the primary magnetic track PT are read out by primary read head RP1, a primary pulse train generally as shown in Fig. 3B will result. When the bits stored in the secondary magnetic track are read out by secondary read head RS1, a secondary pulse train generally as shown in Fig. 3B will result.

The comparing of the primary pulse train of Example No. 8 with the secondary pulse train of Example No. 8, as accomplished by the comparer circuit of Fig. 3 will now be explained. From Fig. 3B it will be seen that primary pulse P31X occurs at approximately 120.7° machine time and that there is no secondary pulse corresponding in time therewith. It it also to be noted that at the machine time at which primary pulse P31X occurs that zone gate CC2 is closed. Primary pulse P31X results in comparer switch 213P being rendered conductive. When comparer switch 213P is rendered conductive a negative pulse from terminal 3 of comparer switch 213P is impressed via lead 214P on terminal 2 of trigger 216P and results in said trigger switching to its "on" position. Also when comparer switch 213P is rendered conductive a negative pulse from terminal 4 of comparer switch 213P is impressed via lead 215P on terminal 2 of inverter switch 221P resulting in said inverter switch being rendered non-conductive. When inverter switch 221P is rendered non-conductive a positive pulse from terminal 3 of said switch is impressed via lead 22P on terminal 1 of switch 223P resulting in switch 223P being rendered conductive. (It is to be recalled that terminal 2 of switch 223P is effectively connected to ground at this time, since zone gate CC2 of closed.) The rendering conductive of switch 223P results in a negative pulse from terminal 3 of switch 223P being impressed via lead 224P on terminal 2 of trigger 225P. The impressing of a negative pulse on terminal 2 of trigger 225P results in said trigger switching to its "on" position. It is to be also noted (see Figs. 3 and 4E of the drawing) that when switch 223P is rendered conductive a negative pulse appears at terminal 4 of said switch. The negative pulse appearing at terminal 4 of switch 223P is impressed via lead 360P, closed switch $S_{AN}$, and lead 360S on terminal 4 of switch 223S. Referring to Fig. 3E of the drawing, which discloses the detailed circuit of switches 223P and 223S, respectively, it will be apparent that when a negative voltage pulse is impressed on terminal 4 of switch 223S a negative pulse appears at terminal 3 of switch 223S. The negative pulse appearing at terminal 3 of switch 223S is impressed via lead 224S on terminal 2 of trigger 225S and results in said trigger switching to its "on" position. (At this point, it is to be noted that with switch $S_{AN}$ closed either both triggers 225P and 225S are rendered conductive, or neither trigger is rendered conductive.) Thus, to summarize, it may be stated that with switch $S_{AN}$ closed, primary pulse P31X of the primary pulse train of Example No. 8 results in triggers 216P, 225P and 225S, respectively, switching to their "on" positions.

At approximately 123° machine time primary pulse P310 occurs. When pulse P310 occurs numeric gate CC3 is closed and trigger 225P is in its "on" position. As a result of trigger 225P being in its "on" position and numeric gate CC3 being closed switch 227P is rendered conductive. As will be recalled from an earlier discussion herein, when switch 227P is conductive then switch 206P is precluded from being rendered conductive. In conclusion, since switch 206P is precluded from being rendered conductive at the machine time at which primary pulse P310 occurs, it is apparent that said primary pulse has no effect on the position of any of the triggers of Fig. 3. Still referring to Fig. 3B it will be seen that secondary pulse S315 occurs at approximately 125.5° machine time, and from Fig. 3A it will be seen that at this machine time numeric gate CC3 is still closed. Now recalling that trigger 225S is in its "on" position, it will be apparent that with numeric gate CC3 closed, switch 227S is conductive. When switch 227S is conductive then switch 206S is precluded from being rendered conductive, and therefore secondary pulse S315 does not result in a change in position of any of the triggers of the comparer circuit of Fig. 3.

Now, at approximately 126° machine time, when output gate CC4 closes, since trigger 216P is in its "on" position, thyratron switch 219P will be rendered conductive. When thyratron switch 219P is conductive relay R–1, i.e., Right Entry Low Indicator, is energized and transfers its contacts (not shown). Relay R–1 is energized at approximately 126° machine time and remains energized until reset cam contact CB8 opens at approximately 162° machine time.

Hence it is seen that the comparer circuit of Fig. 3 distinguished between the primary pulse train of Example No. 8 (which reflected that the word "Alban" is stored in primary record card 101P) and the secondary pulse train of Example No. 8 (which reflected that the number "51063" is stored in secondary record card 101S) by the energization of relay R–1 for an interval in machine time consisting of approximately 36°.

The subsequent resetting of the triggers of the comparer circuit of Fig. 3 and the erasing of the information stored in the primary magnetic track PT and the secondary magnetic track ST are accomplished in the manner previously set out in detail.

BRIEF SUMMARY

Having described in detail the operation of the novel comparing device disclosed herein, its operation will be briefly summarized. Information stored in a primary record card and information stored in a secondary record card is simultaneously read. The information read from said primary record card is serially by column stored on a first magnetic drum having a primary magnetic track: the information read from said secondary record card is serially by column stored on a second magnetic drum having a secondary magnetic track. The first and second drums carrying their respective magnetic tracks rotate in unison at a uniform speed. Disposed internally of said first magnetic drum, in such a position as to be capable of reading the information stored in the primary magnetic track, is a first read head, for convenience referred to as the primary read head. Disposed internally of said second magnetic drum, in such a position as to be capable of reading the information stored in the secondary magnetic track, is a second read head, for convenience referred to as the secondary read head. The primary and secondary read heads each revolve in unison at a uniform speed within their respective magnetic tracks. In this manner the primary read head and the secondary read head accomplish the reading of the information stored in the primary and secondary magnetic tracks respectively. The information read from the primary magnetic track is a series of positive pulses and is for convenience referred to as a primary pulse train. The information read from said secondary magnetic track is also a series of positive pulses and is for convenience referred to as a secondary pulse train. The primary pulse train is impressed on primary pulse train input terminal 1C of the comparer circuit of Fig. 3. The secondary pulse train is impressed on secondary pulse train input terminal 3C of the comparer circuit of Fig. 3. The comparer circuit of Fig. 3 distinguishes between the primary pulse train and the secondary pulse train by energizing: The Right Entry Low Indicator if the right entry is of lower order than the left entry; the Right Entry High Indicator if the right entry is of higher order than the left entry; neither the Right Entry Low Indicator nor the Right Entry High Indicator will be energized if the entries are of equal order.

Many obvious modifications and variations of the novel comparing device disclosed herein will be readily apparent. A few of these are set forth below.

By minor adaptations it would be possible to compare information stored in any of the decks, namely, A, B and C of the primary record card with information stored in any of the decks, namely, A, B and C of the secondary record card.

Modification well within the skill of one skilled in the art would permit a novel comparing device generally of the type herein disclosed to compare the information stored in a primary record card of standard type with information stored in a secondary record card of standard type. A standard type record card being defined as a record card having twelve index positions, or a card having two decks each consisting of six index positions. However, a novel comparing device of the general type herein disclosed, it will be realized, is not necessarily limited to a standard type record card, nor to the three deck type of record card disclosed herein.

The embodiment of the novel comparing device herein disclosed accomplishes the comparison of five columns of information stored in the primary record card with five columns of information stored in the secondary record card. It will be apparent that by modification the comparison of more than five or less than five columns of the primary record card with a like, or different, number of secondary record card columns may be accomplished. It is to be appreciated that the number of primary record card columns may differ from the number of secondary record card columns and yet comparison may be accomplished. It is also to be appreciated that the information read from the primary record card may be made up of columns from different decks of the primary record card, likewise with respect to the information read from the secondary record card. The information that results in the primary pulse train may originally be obtained wholly or in part from the primary record card or elsewhere, likewise with respect to the secondary pulse train.

It will also be apparent that if the novel device herein disclosed is to be used only to compare numeric information or only to compare alphabetic information it may be simplified in certain respects.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A comparer circuit for rendering a comparison of a primary pulse train with respect to a secondary pulse train, having: a first portion including a primary pulse train input terminal for accepting a primary pulse train, first electronic switch means coupling said primary pulse train input terminal to a first comparer switch, a first trigger responsively coupled to said first comparer switch, a first thyratron switch controlled by said first trigger; a second portion including a secondary pulse train input terminal for accepting a secondary pulse train, second electronic switch means coupling said secondary pulse train input terminal to a second comparer switch, a second trigger responsively coupled to said second comparer switch, a second thyratron switch controlled by said second trigger; connecting means electrically connecting said first electronic switch means with said second comparer switch, said second electronic switch means with said first comparer switch, said first trigger with said second trigger, and said first thyratron switch with said second thyratron switch; and means respectively controlled by said first and said second thyratron switches for manifesting the result of said comparison.

References Cited in the file of this patent

UNITED STATES PATENTS

| | | |
|---|---|---|
| 2,514,054 | Hallden | July 4, 1950 |
| 2,531,895 | Shafer et al. | Nov. 28, 1950 |
| 2,628,346 | Burkhart | Feb. 10, 1953 |
| 2,660,372 | Leclerc | Nov. 24, 1953 |
| 2,673,032 | Luhn | Mar. 23, 1954 |
| 2,679,638 | Bensky | May 25, 1954 |
| 2,680,239 | Daniels et al. | June 1, 1954 |
| 2,702,380 | Brustman et al. | Feb. 15, 1955 |
| 2,712,898 | Knutsen | July 12, 1955 |
| 2,737,646 | Muffly | Mar. 6, 1956 |
| 2,776,418 | Townsend | Jan. 1, 1957 |
| 2,785,856 | Hobbs | Mar. 19, 1957 |
| 2,821,696 | Shiowitz et al. | Jan. 28, 1958 |